US011636816B2

(12) United States Patent
Ishihara et al.

(10) Patent No.: US 11,636,816 B2
(45) Date of Patent: Apr. 25, 2023

(54) DISPLAY DEVICE

(71) Applicant: JAPAN DISPLAY INC., Tokyo (JP)

(72) Inventors: Tomoyuki Ishihara, Tokyo (JP); Junji Kobashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/526,233

(22) Filed: Nov. 15, 2021

(65) Prior Publication Data

US 2022/0157269 A1 May 19, 2022

(30) Foreign Application Priority Data

Nov. 18, 2020 (JP) .............................. JP2020-192095

(51) Int. Cl.
*G09G 3/36* (2006.01)
*G02F 1/1347* (2006.01)
*G09G 3/34* (2006.01)

(52) U.S. Cl.
CPC ......... *G09G 3/3607* (2013.01); *G02F 1/1347* (2013.01); *G09G 3/3406* (2013.01); *G09G 2300/0452* (2013.01); *G09G 2320/028* (2013.01)

(58) Field of Classification Search
None
See application file for complete search history.

(56) References Cited

U.S. PATENT DOCUMENTS

| | | | | |
|---|---|---|---|---|
| 2011/0279749 | A1* | 11/2011 | Erinjippurath | ....... H04N 13/324 345/32 |
| 2016/0093255 | A1* | 3/2016 | Aoki | ................... G06F 3/04166 345/88 |
| 2018/0231836 | A1* | 8/2018 | Suzuki | ................ G02F 1/13471 |
| 2021/0142745 | A1 | 5/2021 | Kimura et al. | |

FOREIGN PATENT DOCUMENTS

WO 2019225137 A1 11/2019

\* cited by examiner

*Primary Examiner* — Parul H Gupta
(74) *Attorney, Agent, or Firm* — K&L Gates LLP

(57) ABSTRACT

A display device incudes: a display panel including a plurality of pixels; and a dimming panel that is disposed between the display panel and a light source of light to be emitted to the display panel and includes a plurality of dimming pixels. When one of the pixels produces an output at highest luminance and the other pixels produce an output at lowest luminance to the display panel, the light is transmitted through a predetermined one of the dimming pixels located on an optical axis of the light that is emitted to the one of the pixels and through the other dimming pixels arranged around the predetermined dimming pixel. A degree of transmission of the light through the other dimming pixels decreases as the light is away along one direction from the predetermined dimming pixel, and there are a plurality of directions having different degrees of the decrease.

11 Claims, 12 Drawing Sheets

| SPATIAL PROCESSING | FRONT VIEW | OBLIQUE VIEW | SCHEMATIC DIAGRAM |
|---|---|---|---|
| NOT PERFORMED | NORMAL | DOUBLE IMAGE |  |
| FIRST COMPARATIVE EXAMPLE | THINNED | THINNED |  |
| SECOND COMPARATIVE EXAMPLE | HALOED | HALOED |  |
| EMBODIMENT | NORMAL | NORMAL |  |

FIG.10

| y\x | -6 | -5 | -4 | -3 | -2 | -1 | 0 | 1 | 2 | 3 | 4 | 5 | 6 |
|---|---|---|---|---|---|---|---|---|---|---|---|---|---|
| -6 | 0 | 0 | 0 | 0 | 0 | 0 | 26 | 0 | 0 | 0 | 0 | 0 | 0 |
| -5 | 0 | 0 | 0 | 0 | 13 | 26 | 76 | 26 | 13 | 0 | 0 | 0 | 0 |
| -4 | 0 | 0 | 0 | 13 | 26 | 51 | 142 | 51 | 26 | 13 | 0 | 0 | 0 |
| -3 | 0 | 0 | 13 | 26 | 51 | 100 | 211 | 100 | 51 | 26 | 13 | 0 | 0 |
| -2 | 0 | 13 | 26 | 51 | 100 | 182 | 246 | 182 | 100 | 51 | 26 | 13 | 0 |
| -1 | 0 | 26 | 51 | 111 | 182 | 241 | 254 | 241 | 182 | 111 | 51 | 26 | 0 |
| 0 | 26 | 76 | 142 | 211 | 246 | 254 | 255 | 254 | 246 | 211 | 142 | 76 | 26 |
| 1 | 0 | 26 | 51 | 111 | 182 | 241 | 254 | 241 | 182 | 111 | 51 | 26 | 0 |
| 2 | 0 | 13 | 26 | 51 | 100 | 182 | 246 | 182 | 100 | 51 | 26 | 13 | 0 |
| 3 | 0 | 0 | 13 | 26 | 51 | 100 | 211 | 100 | 51 | 26 | 13 | 0 | 0 |
| 4 | 0 | 0 | 0 | 13 | 26 | 51 | 142 | 51 | 26 | 13 | 0 | 0 | 0 |
| 5 | 0 | 0 | 0 | 0 | 13 | 26 | 76 | 26 | 13 | 0 | 0 | 0 | 0 |
| 6 | 0 | 0 | 0 | 0 | 0 | 0 | 26 | 0 | 0 | 0 | 0 | 0 | 0 |

FIG.12

| y\x | -6 | -5 | -4 | -3 | -2 | -1 | 0 | 1 | 2 | 3 | 4 | 5 | 6 |
|---|---|---|---|---|---|---|---|---|---|---|---|---|---|
| 6 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 |
| 4 | 0 | 0 | 26 | 0 | 0 | 0 | 0 | 0 | 0 | 26 | 0 | 0 | 0 |
| 3 | 0 | 0 | 0 | 100 | 51 | 13 | 0 | 13 | 51 | 100 | 0 | 0 | 0 |
| 2 | 0 | 0 | 0 | 51 | 211 | 142 | 111 | 142 | 211 | 51 | 0 | 0 | 0 |
| 1 | 0 | 0 | 0 | 13 | 142 | 254 | 241 | 254 | 142 | 13 | 0 | 0 | 0 |
| 0 | 0 | 0 | 0 | 0 | 111 | 241 | 255 | 241 | 111 | 0 | 0 | 0 | 0 |
| -1 | 0 | 0 | 0 | 13 | 142 | 254 | 241 | 254 | 142 | 13 | 0 | 0 | 0 |
| -2 | 0 | 0 | 0 | 51 | 211 | 142 | 111 | 142 | 211 | 51 | 0 | 0 | 0 |
| -3 | 0 | 0 | 0 | 100 | 51 | 13 | 0 | 13 | 51 | 100 | 0 | 0 | 0 |
| -4 | 0 | 0 | 26 | 0 | 0 | 0 | 0 | 0 | 0 | 26 | 0 | 0 | 0 |
| -5 | 0 | 0 | 0 | 0 | 0 | 0 | 0 | 0 | 0 | 0 | 0 | 0 | 0 |
| -6 | 0 | 0 | 0 | 0 | 0 | 0 | 0 | 0 | 0 | 0 | 0 | 0 | 0 |

FIG.15

| x | -6 | -5 | -4 | -3 | -2 | -1 | 0 | 1 | 2 | 3 | 4 | 5 | 6 |
|---|---|---|---|---|---|---|---|---|---|---|---|---|---|
|  | 0.00 | 0.03 | 0.06 | 0.1 | 0.2 | 0.5 | 1.0 | 0.5 | 0.2 | 0.1 | 0.06 | 0.03 | 0.00 |

FIG.16

| y | -6 | -5 | -4 | -3 | -2 | -1 | 0 | 1 | 2 | 3 | 4 | 5 | 6 |
|---|---|---|---|---|---|---|---|---|---|---|---|---|---|
|  | 0.00 | 0.02 | 0.05 | 0.09 | 0.18 | 0.4 | 1.0 | 0.4 | 0.18 | 0.09 | 0.05 | 0.02 | 0.00 |

DISPLAY DEVICE

CROSS-REFERENCE TO RELATED APPLICATION

This application claims the benefit of priority from Japanese Patent Application No. 2020-192095 filed on Nov. 18, 2020, the entire contents of which are incorporated herein by reference.

BACKGROUND

1. Technical Field

What is disclosed herein relates to a display device.

2. Description of the Related Art

A configuration is known in which a dimming panel is provided between a liquid crystal display panel and a light source to increase contrast of an image (for example, International Application Publication No. WO2019/225137).

The liquid crystal display panel has anisotropy in which a viewing angle is changed by an angle at which the liquid crystal display panel is viewed. Conventional techniques do not take into account such anisotropy of the liquid crystal display panel in control of the dimming panel. As a result, display quality may be reduced by mismatch between control of the degree of dimming and viewing angle characteristics of the liquid crystal display panel.

For the foregoing reasons, there is a need for a display device capable of both performing dimming using a dimming panel and restraining the display quality from deteriorating.

SUMMARY

According to an aspect, a display device incudes: a display panel including a plurality of pixels; and a dimming panel that is disposed between the display panel and a light source of light to be emitted to the display panel and includes a plurality of dimming pixels. When one of the pixels produces an output at highest luminance and the other pixels produce an output at lowest luminance to the display panel, the light is transmitted through a predetermined one of the dimming pixels located on an optical axis of the light that is emitted to the one of the pixels and through the other dimming pixels arranged around the predetermined dimming pixel. A degree of transmission of the light through the other dimming pixels decreases as the light is away along one direction from the predetermined dimming pixel, and there are a plurality of directions having different degrees of the decrease.

BRIEF DESCRIPTION OF THE DRAWINGS

FIG. 10 is a diagram illustrating an exemplary lookup table (LUT);

FIG. 12 is a diagram illustrating an exemplary LUT in the first modification;

FIG. 15 is a diagram illustrating an exemplary LUT;

FIG. 16 is a diagram illustrating another exemplary LUT;

DETAILED DESCRIPTION

Figure 1:
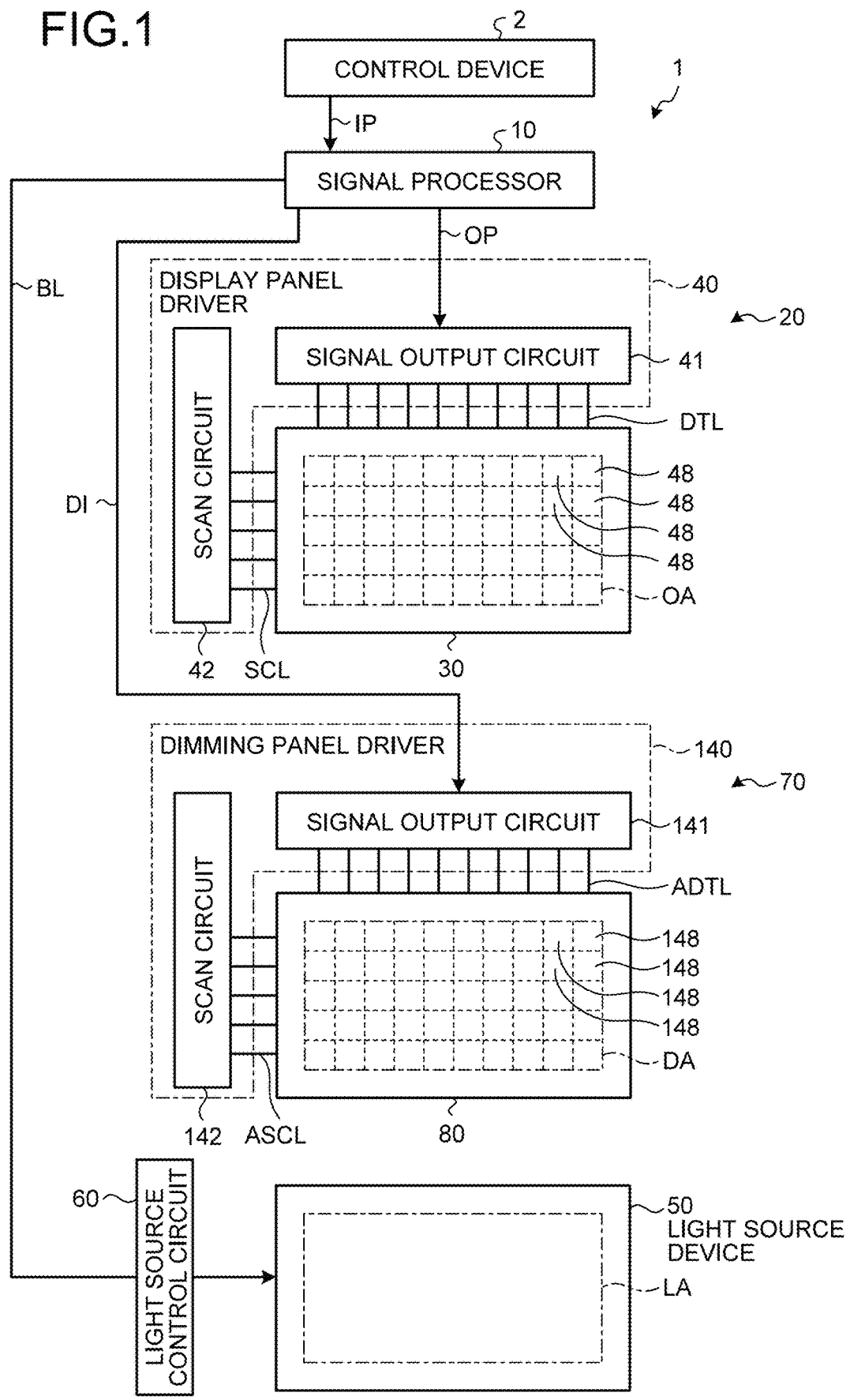
FIG. 1 is a diagram illustrating a main configuration example of a display device according to an embodiment.

The following describes an embodiment of the present disclosure with reference to the drawings. What is disclosed herein is merely an example, and the present disclosure naturally encompasses appropriate modifications easily conceivable by those skilled in the art while maintaining the gist of the invention. To further clarify the description, the drawings schematically illustrate, for example, widths, thicknesses, and shapes of various parts as compared with actual aspects thereof, in some cases. However, they are merely examples, and interpretation of the present disclosure is not limited thereto. The same element as that illustrated in a drawing that has already been discussed is denoted by the same reference numeral through the description and the drawings, and detailed description thereof will not be repeated in some cases where appropriate.

In this disclosure, when an element is described as being "on" another element, the element can be directly on the other element, or there can be one or more elements between the element and the other element.

Embodiment

FIG. 1 is a diagram illustrating a main configuration example of a display device 1 according to the embodiment. The display device 1 of the embodiment includes a signal processor 10, a display part 20, a light source device 50, a light source control circuit 60, and a dimmer 70. The signal processor 10 performs various types of output based on an input signal IP received from an external control device 2 and thus controls operations of the display part 20, the light source device 50, and the dimmer 70. The input signal IP is a signal serving as data for outputting an image to be displayed on the display device 1 and is, for example, a red-green-blue (RGB) image signal. The signal processor 10 outputs, to the display part 20, an output image signal OP generated based on the input signal IP. The signal processor 10 also outputs, to the dimmer 70, a dimming signal DI generated based on the input signal IP. After receiving the input signal IP, the signal processor 10 outputs, to the light source control circuit 60, a light source drive signal BL for controlling lighting of the light source device 50. The light source control circuit 60 is, for example, a driver circuit of the light source device 50 and operates the light source device 50 in response to the light source drive signal BL. The light source device 50 includes a light source that emits light from a light-emitting area LA. In the embodiment, the light source control circuit 60 operates the light source device 50 so as to emit a constant amount of light from the light-emitting area LA of the light source device 50 in accordance with display timing of a frame image.

The display part 20 includes a display panel 30 and a display panel driver 40. The display panel 30 has a display area OA provided with a plurality of pixels 48. The pixels 48 are arranged, for example, in a matrix having a row-column configuration. The display panel 30 of the embodiment is a liquid crystal image display panel. The display panel driver 40 includes a signal output circuit 41 and a scan circuit 42. The signal output circuit 41 is a circuit serving as what is called a source driver and drives the pixels 48 in accordance with the output image signal OP. The scan circuit 42 is a circuit serving as what is called a gate driver and outputs a drive signal that scans the pixels 48 arranged in a matrix in units of a predetermined number of rows (for example, in units of one row). The pixels 48 are driven so as to output gradation values corresponding to the output image signal OP at the timing of the output of the drive signal.

The dimmer 70 adjusts the amount of light that is emitted from the light source device 50 and is output through the display area OA. The dimmer 70 includes a dimming panel 80 and a dimming panel driver 140. The dimming panel 80 has a dimming area DA provided so as to be capable of varying transmittance of light. The dimming area DA is disposed in a position overlapping the display area OA when the display area OA is viewed in a plan view. The dimming area DA covers the entire display area OA in the plan view. The light-emitting area LA covers the entire display area OA and the entire dimming area DA in the plan view.

Figure 2:
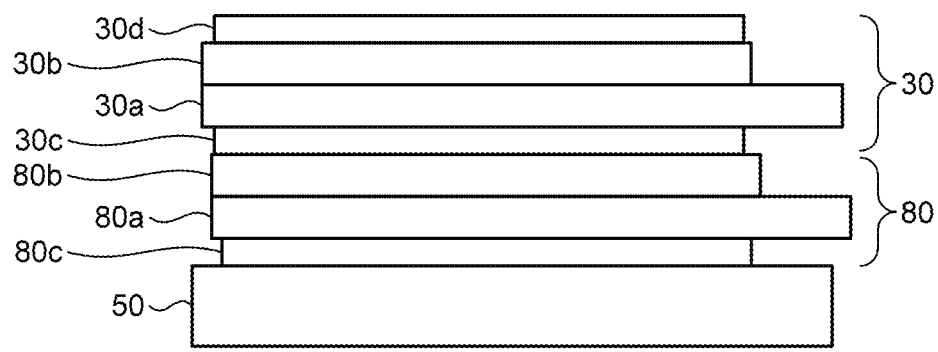
FIG. 2 is a diagram illustrating an exemplary positional relation between an image display panel, a dimming panel, and a light source device.
Figure 2:
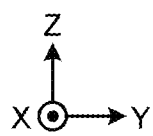

FIG. 2 is a diagram illustrating an exemplary positional relation between the display panel 30, the dimming panel 80, and the light source device 50. In the embodiment, the display panel 30, the dimming panel 80, and the light source device 50 are stacked as illustrated in FIG. 2. Specifically, the dimming panel 80 is stacked on a light-emitting surface side of the light source device 50 from which the light is emitted. The display panel 30 is stacked on a side opposite to the light source device 50 with the dimming panel 80 interposed therebetween. The light emitted from the light source device 50, the amount of which is adjusted by the dimming area DA of the dimming panel 80, illuminates the display panel 30. The display panel 30 is illuminated from a back surface side thereof where the light source device 50 is located, and outputs the image for display to a side (display surface side) opposite to the back surface side. In this manner, the light source device 50 serves as a backlight that illuminates the display area OA of the display panel 30 from the back surface thereof. In the embodiment, the dimming panel 80 is provided between the display panel 30 and the light source device 50. Hereinafter, a Z-direction refers to a direction in which the display panel 30, the dimming panel 80, and the light source device 50 are stacked. An X-direction and a Y-direction refer to two directions orthogonal to the Z-direction. The X-direction is orthogonal to the Y-direction. The pixels 48 are arranged in a matrix along the X-direction and the Y-direction. In the following description, h denotes the number of the pixels 48 arranged in the X-direction, and v denotes the number of the pixels 48 arranged in the Y-direction. A notation (h) represents a case where coordinate management in the X-direction is performed depending on positions of the pixels 48 arranged in the X-direction. A notation (v) represents a case where the coordinate management in the Y-direction is performed depending on positions of the pixels 48 arranged in the Y-direction. A notation (h, v) represents a case where the coordinate management in the X-direction and the Y-direction is performed depending on the positions of the pixels 48 arranged in the X-direction and the Y-direction.

The display panel 30 includes an array substrate 30a and a counter substrate 30b that is located on a display surface side of the array substrate 30a and faces the array substrate 30a. As will be described later, a liquid crystal layer LC1 is disposed between the array substrate 30a and the counter substrate 30b (refer to FIG. 5). A polarizing plate 30c is provided on a back surface side of the array substrate 30a. A polarizing plate 30d is provided on a display surface side of the counter substrate 30b. The dimming panel 80 includes a first substrate 80a and a second substrate 80b that is located on a display surface side of the first substrate 80a and faces the first substrate 80a. As will be described later, a liquid crystal layer that is the same as the liquid crystal layer LC1 is disposed between the first substrate 80a and the second substrate 80b. A polarizing plate 80c is provided on a back surface side of the first substrate 80a. The polarizing plate 30c polarizes light both on the back surface side of the display panel 30 and on a display surface side of the dimming panel 80.

Figure 3:
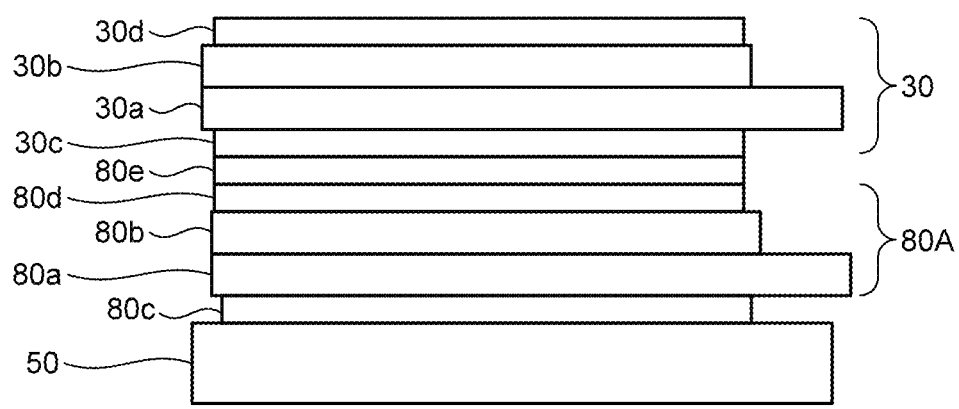
FIG. 3 is a diagram illustrating an example in which a polarizing plate is provided on a display surface side of the dimming panel.
Figure 3:
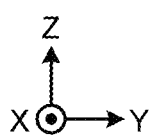

FIG. 3 is a diagram illustrating an example in which a polarizing plate 80d is provided on the display surface side of a dimming panel 80A. As illustrated in FIG. 3, the polarizing plate 80d may be provided on a display surface side of the second substrate 80b. As illustrated in FIG. 3, a diffusion layer 80e for diffusing light may be interposed between the polarizing plate 30c and the polarizing plate 80d.

Figure 4:
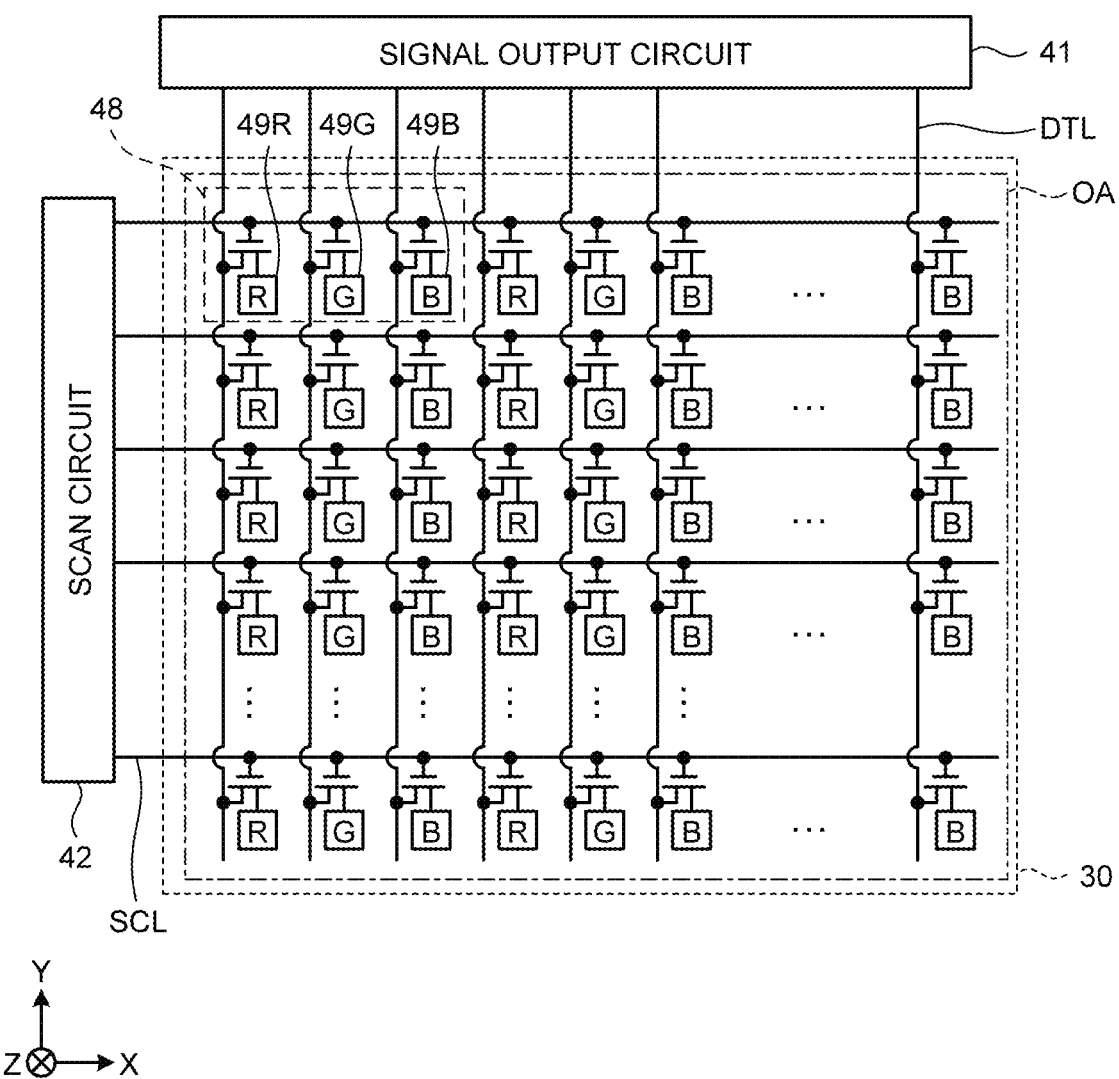
FIG. 4 is a diagram illustrating an exemplary pixel array of the image display panel.

FIG. 4 is a diagram illustrating an exemplary pixel array of the display panel 30. As illustrated in FIG. 4, each of the pixels 48 includes, for example, a first sub-pixel 49R, a second sub-pixel 49G, and a third sub-pixel 49B. The first sub-pixel 49R displays a first primary color (for example, red). The second sub-pixel 49G displays a second primary color (for example, green). The third sub-pixel 49B displays a third primary color (for example, blue). In this manner, each of the pixels 48 arranged in a matrix on the display panel 30 includes the first sub-pixel 49R for displaying a first color, the second sub-pixel 49G for displaying a second color, and the third sub-pixel 49B for displaying a third color. The first color, the second color, and the third color are not limited to the first primary color, the second primary color, and the third primary color, but only need to be different colors from one another, such as complementary colors. In the following description, the first sub-pixel 49R, the second sub-pixel 49G, and the third sub-pixel 49B will be each called a sub-pixel 49 when they need not be distinguished from one another.

The pixel 48 may further include another sub-pixel 49 in addition to the first sub-pixel 49R, the second sub-pixel 49G, and the third sub-pixel 49B. For example, the pixel 48 may include a fourth sub-pixel for displaying a fourth color. The fourth sub-pixel displays a fourth color (for example, white). The fourth sub-pixel is preferably brighter than the first sub-pixel 49R for displaying the first color, the second sub-pixel 49G for displaying the second color, and the third sub-pixel 49B for displaying the third color, when they are irradiated with the same light source lighting amount.

The display device 1 is more specifically a transmissive color liquid crystal display device. As illustrated in FIG. 4, the display panel 30 is a color liquid crystal display panel, in which a first color filter for transmitting the first primary color is disposed between the first sub-pixel 49R and an image viewer, a second color filter for transmitting the second primary color is disposed between the second sub-pixel 49G and the image viewer, and a third color filter for transmitting the third primary color is disposed between the third sub-pixel 49B and the image viewer. The first color filter, the second color filter, and the third color filter are components included in a filter film 26 to be described later.

When the fourth sub-pixel is provided, no color filter is disposed between the fourth sub-pixel and the image viewer. In this case, a large level difference in height is generated at the fourth sub-pixel. Therefore, a transparent resin layer instead of the color filter may be provided on the fourth sub-pixel. This configuration can restrain the generation of the large level difference in height at the fourth sub-pixel.

The signal output circuit 41 is electrically coupled to the display panel 30 through signal lines DTL. The display panel driver 40 uses the scan circuit 42 to select the sub-pixel 49 on the display panel 30 and to control ON and OFF of a switching element (such as a thin-film transistor (TFT)) for controlling operation (light transmittance) of the sub-pixel 49. The scan circuit 42 is electrically coupled to the display panel 30 through scan lines SCL.

In the embodiment, the signal lines DTL are arranged in the X-direction. Each of the signal lines DTL extends in the Y-direction. The scan lines SCL are arranged in the Y-direction. Each of the scan lines SCL extends in the X-direction. Thus, in the embodiment, in response to the drive signal output from the scan circuit 42, the pixels 48 are driven for each pixel row (line) including a plurality of the pixels 48 that are arranged in the X-direction so as to share the scan line SCL. Hereinafter, a simple notation of "line" refers to a pixel row including the pixels 48 that are arranged in the X-direction so as to share the scan line SCL.

The term "horizontal scan direction" refers to a direction along the extending direction of each of the scan lines SCL. The term "vertical scan direction" refers to the arrangement direction of the scan lines SCL. In the embodiment, the X-direction corresponds to the horizontal scan direction, and the Y-direction corresponds to the vertical scan direction.

Figure 5:
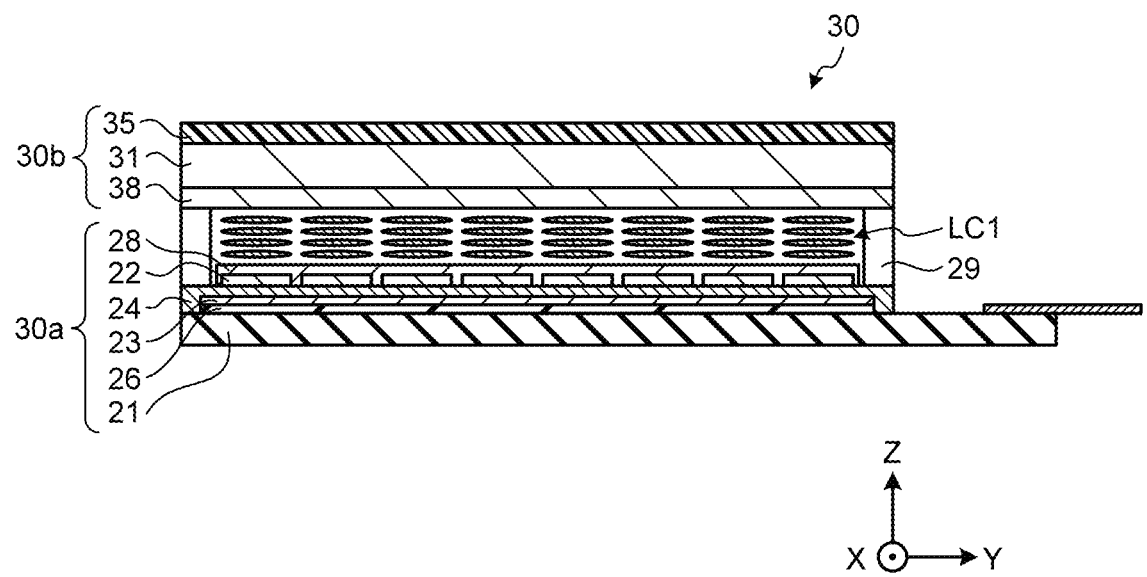
FIG. 5 is a sectional view illustrating an exemplary schematic sectional structure of the image display panel.

FIG. 5 is a sectional view illustrating an exemplary schematic sectional structure of the display panel 30. The array substrate 30*a* includes the filter film 26 provided on the upper side of a pixel substrate 21 such as a glass substrate, a counter electrode 23 provided on the upper side of the filter film 26, an insulating film 24 provided on the upper side of the counter electrode 23 so as to be in contact therewith, pixel electrodes 22 on the upper side of the insulating film 24, and a first orientation film 28 provided on the uppermost surface side of the array substrate 30*a*. The counter substrate 30*b* includes a counter pixel substrate 31 such as a glass substrate, a second orientation film 38 provided on the lower surface of the counter pixel substrate 31, and a polarizing plate 35 provided on the upper surface thereof. The array substrate 30*a* is fixed to the counter substrate 30*b* with a sealing part 29 interposed therebetween. The liquid crystal layer LC1 is sealed in a space surrounded by the array substrate 30*a*, the counter substrate 30*b*, and the sealing part 29. The liquid crystal layer LC1 contains liquid crystal molecules that change in orientation direction depending on an electric field applied thereto. The liquid crystal layer LC1 modulates light passing through the inside of the liquid crystal layer LC1 depending on the state of the electric field. The electric field applied between the pixel electrodes 22 and the counter electrode 23 changes the orientations of the liquid crystal molecules of the liquid crystal layer LC1 and thus changes the transmission amount of the light passing through the liquid crystal layer LC1. The sub-pixels 49 include the respective pixel electrodes 22. The switching elements for individually controlling the operation (light transmittance) of the sub-pixels 49 are electrically coupled to the pixel electrodes 22.

The dimmer 70 includes the dimming panel 80 and the dimming panel driver 140. The dimming panel 80 of the embodiment has the same configuration as that of the display panel 30 illustrated in FIG. 5 except that the filter film 26 is not included. Thus, the dimming panel 80 includes dimming pixels 148 including the sub-pixels 49 not provided with the color filters (refer to FIG. 1) instead of the pixels 48 including the first sub-pixels 49R, the second sub-pixels 49G, and the third sub-pixels 49B distinguished by the colors of the color filters (refer to FIG. 4).

A signal output circuit 141 and a scan circuit 142 included in the dimming panel driver 140 have the same configurations as those of the signal output circuit and the scan circuit of the display panel driver 40 except that the signal output circuit 141 and the scan circuit 142 are coupled to the dimming panel 80. Signal lines ADTL between the dimming panel 80 and the dimming panel driver 140 illustrated in FIG. 1 have the same configuration as that of the signal lines DTL described with reference to FIG. 4. Scan lines ASCL between the dimming panel 80 and the dimming panel driver 140 illustrated in FIG. 1 have the same configuration as that of the scan lines SCL described with reference to FIG. 4.

In the embodiment, the arrangement of the pixels 48 in the display area OA is the same as the arrangement of the dimming pixels 148 in the dimming area DA. Consequently, in the embodiment, the number of the pixels 48 arranged in the X-direction of the display area OA is the same as the number of the dimming pixels 148 arranged in the X-direction of the dimming area DA. In the embodiment, the number of the pixels 48 arranged in the Y-direction of the display area OA is the same as the number of the dimming pixels 148 arranged in the Y-direction of the dimming area DA. In the embodiment, the display area OA overlaps the dimming area DA in an XY-plane view. The Z-direction corresponds to an optical axis LL (refer to FIG. 7) of the light emitted from the light-emitting area LA of the light source device 50. Thus, one of the pixels 48 shares the optical axis LL with one of the dimming pixels 148 located in a position overlapping the pixel 48 in the XY-plane view. However, the light emitted from the light-emitting area LA is radially diffused incoherent light. Therefore, light rays in directions not along the optical axis LL may also enter the dimming pixels 148 and the pixels 48.

Figure 6:
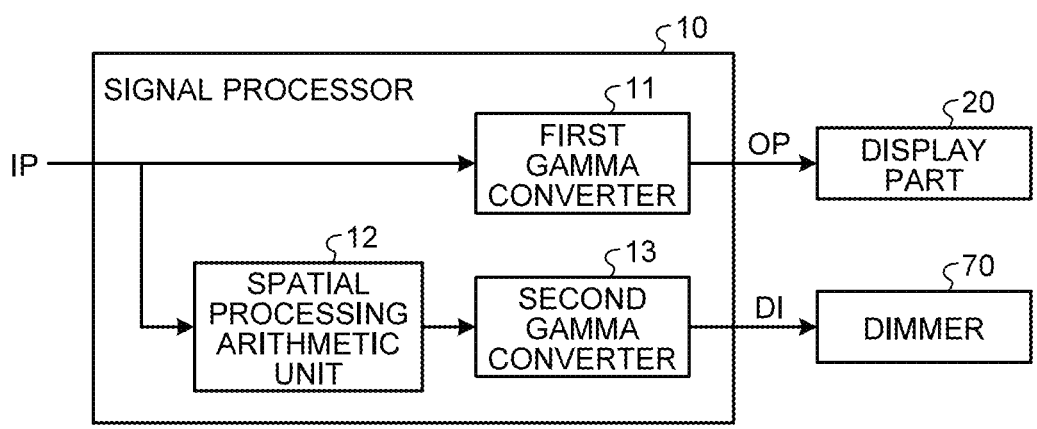
FIG. 6 is a block diagram illustrating a functional configuration example of a signal processor.

FIG. 6 is a block diagram illustrating a functional configuration example of the signal processor 10. The signal processor 10 includes a first gamma converter 11, a spatial processing arithmetic unit 12, and a second gamma converter 13.

When gamma correction is required in obtaining an output value from an input value, the first gamma converter 11 performs gamma correction processing. The input value herein is an RGB gradation value of each of the pixels included in the frame image represented by the input signal IP. The output value is brightness of the pixel 48 recognized by a user viewing the display area OA when the pixel 48 included in the display panel 30 is controlled at a voltage corresponding to the input value. In the embodiment, an appropriate value of the output value is assumed to be obtained by controlling the pixel 48 in accordance with the input value from the viewpoint of a one-to-one relation between the RGB gradation value and each of the pixels 48, so that no particular correction is performed. However, depending on the gamma characteristics of the display panel 30, the first gamma converter 11 performs the gamma correction processing.

The spatial processing arithmetic unit 12 performs spatial processing. The spatial processing refers to processing to determine a dimming gradation value to be applied to the dimming pixel 148 based on the input value for one of the pixels 48 sharing the optical axis LL with the dimming pixel 148 and input values for the other pixels 48 arranged around the one of the pixels 48. The dimming gradation value is a value indicating a degree of transmission of light through the dimming pixel 148. That is, the voltage of a signal supplied from the signal output circuit 141 to control the orientation of a liquid crystal layer (having the same configuration as that of the liquid crystal layer LC1 illustrated in FIG. 5) included in the dimming pixel 148 corresponds to the dimming gradation value.

Figure 7:
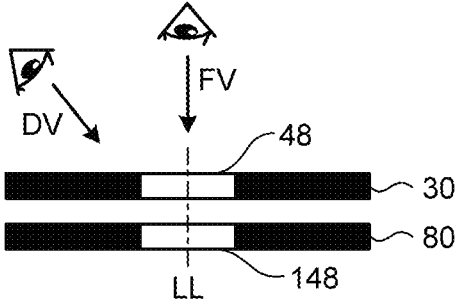
FIG. 7 is a diagram illustrating relations between types of spatial processing, states of an image viewed in a front view FV and an oblique view DV, and schematic diagrams illustrating outlines of the spatial processing.
Figure 7:
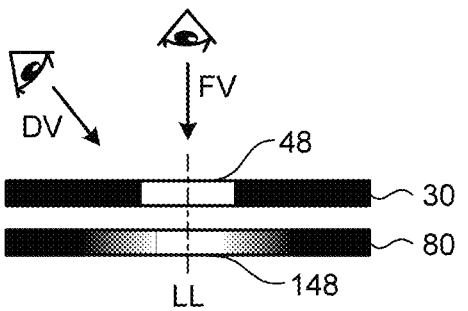
Figure 7:
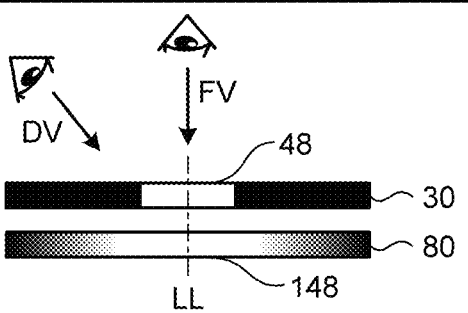
Figure 7:
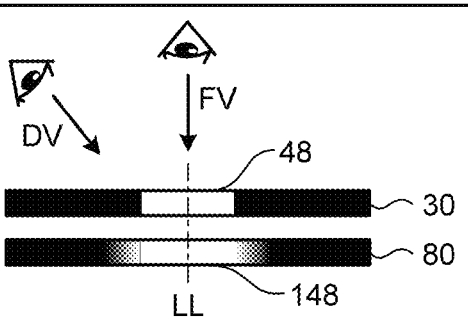

FIG. 7 is a diagram illustrating relations between types of the spatial processing, states of an image viewed in a front view FV and an oblique view DV, and schematic diagrams illustrating outlines of the spatial processing. In each of the schematic diagrams of FIG. 7, the front view FV and the oblique view DV are indicated by a position of an eye and an angle of a line of sight to the display panel 30.

First, the following describes a case where the spatial processing is not performed, that is, the "spatial processing" in FIG. 7 is "not performed". The case where the spatial processing is not performed refers to a case where the dimming gradation value applied to the dimming pixel 148 corresponds only to the input value for the pixel 48 sharing the optical axis LL with the dimming pixel 148. In this case, the image is normally recognized in the front view FV. However, in the oblique view DV, parallax occurs between an image viewed by the right eye and an image viewed by the left eye due to mismatch between the optical axis LL, which is shared by the pixel 48 and the dimming pixel 148, and the line of sight. This parallax causes the user viewing the display panel 30 at an angle of the oblique view DV to recognize the image as a double image.

Therefore, when the pixel 48 is controlled to transmit light corresponding to an RGB gradation value larger than zero, a certain amount of light is made to be transmitted not only through the dimming pixel 148 sharing the optical axis LL with the pixel 48, but also through the other dimming pixels 148 located around the dimming pixel 148. That is, the light is transmitted not only based on "the optical axis LL of the pixel 48 and the dimming pixel 148 with respect to the front view FV", but also based on the input values for the other pixels 48 arranged around the pixel 48. This operation can restrain the recognition of the double image in the oblique view DV that would occur when the spatial processing is not performed.

However, as in the case where the "spatial processing" is a "first comparative example" in FIG. 7, when the area in which the dimming pixels 148 transmit the light is insufficient with respect to an angle of the front view FV and the oblique view DV with respect to the pixels 48 transmitting the light, thinning occurs in which a line drawn by dots of an image viewed by lighting the pixels 48 on the display panel 30 looks thinner.

As in the case where the "spatial processing" is a "second comparative example" in FIG. 7, when the area in which the dimming pixels 148 transmit the light is unnecessarily large with respect to the angle of the front view FV and the oblique view DV with respect to the pixels 48 transmitting the light, the image viewed by lighting the pixels 48 on the display panel 30 is viewed as if a halo appears. As described above, the display quality has room for improvement when the "spatial processing" is "not performed", the "first comparative example", or the "second comparative example".

Therefore, in the embodiment, the degree of transmission of light of each of the dimming pixels 148 is controlled taking into account the gradation value of each of the pixels 48 and viewing angle characteristics of the display panel 30. This control can reduce the occurrence of the states of, for example, the "first comparative example" and the "second comparative example" in FIG. 7. That is, as in the case where "spatial processing" is the "embodiment" in FIG. 7, the normal image can be viewed in the front view FV and the oblique view DV. The following describes the spatial processing performed in the embodiment with reference to FIGS. 8 to 10.

The term "viewing angle" refers to an angular range in which the user viewing display output content of the display device 1 can sufficiently recognize a luminance difference of the pixels 48 controlled so as to be lit at different degrees of luminance, as a difference in contrast. A reference angle (zero degrees) in the viewing angle refers to an angle in a case where the user views the display area OA from a position in the Z-direction (right in front) of the display area OA. The term "viewing angle characteristics" refers to characteristics regarding the contrast of the display output content such as the width of the viewing angle determined by, for example, a driving method of liquid crystals employed for the display panel 30. More specifically, the term "viewing angle characteristics" refers to "a relation of the position and angle of the user viewing the display area OA with respect to the display area OA with the recognition of the contrast of the display output content (image) in the display area OA recognized by the user" that is generated by a relation between the luminance difference of the pixels 48 and the contrast of the pixels 48 recognized by the user when the user located in a position shifted from the position in the Z-direction of the display area OA recognizes the display area OA.

Figure 8:
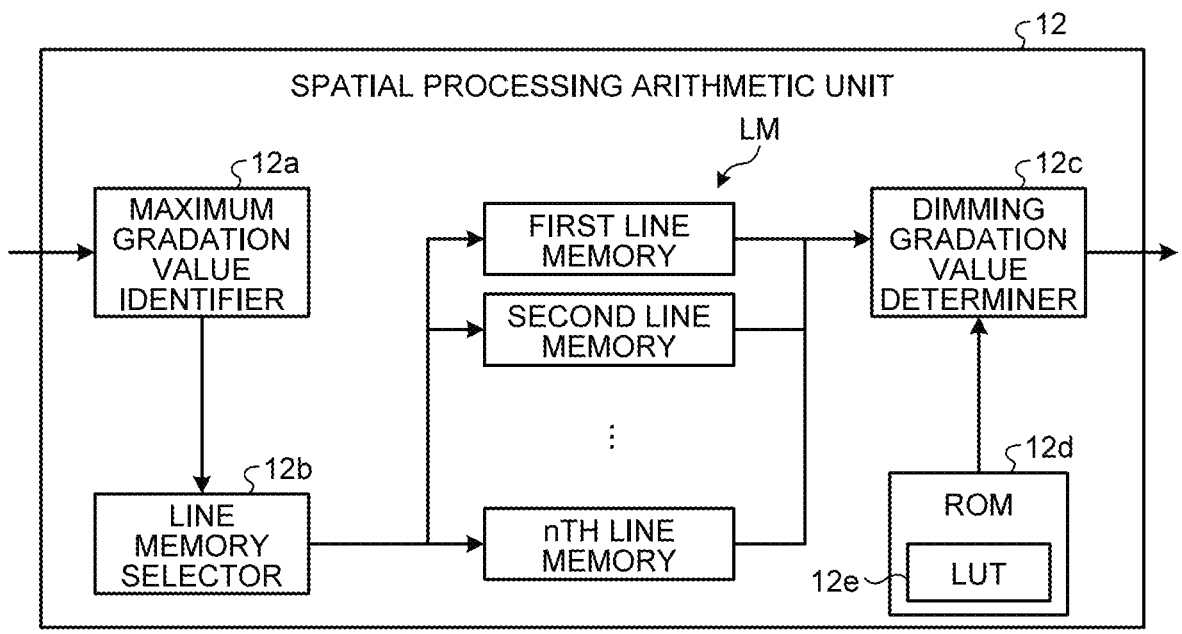
FIG. 8 is a block diagram illustrating a main configuration example of a spatial processing arithmetic unit.

FIG. 8 is a block diagram illustrating a main configuration example of the spatial processing arithmetic unit 12. The spatial processing arithmetic unit 12 includes, for example, a maximum gradation value identifier 12a, a line memory selector 12b, a line memory LM, a dimming gradation value determiner 12c, and a read-only memory (ROM) 12d. The ROM 12d holds a lookup table (LUT) 12e.

The maximum gradation value identifier 12a identifies the maximum gradation value of each of the pixels 48. The maximum gradation value of one of the pixels 48 refers to the highest gradation value of gradation values individually supplied to the sub-pixels 49 included in the one of the pixels 48. The gradation values for determining intensities of electrical signals (pixel signals) for individually driving the sub-pixels 49 correspond to the output image signal OP. When the input signal IP corresponding to one frame image is received by the display device 1, the output image signal OP includes a plurality of pieces of pixel data for displaying the frame image. Each piece of the pixel data indicates the RGB gradation value. The RGB gradation value is a combination of respective gradation values of red (R), green (G), and blue (B). When the RGB gradation value is represented in the form of (R, G, B)=(a, b, c), each of a, b, and c is a numerical value within a numerical value range determined based on the number of bits (q bits) of the pixel data that can be received by the display device 1. For example, in the case of eight bits (q=8), each of a, b, and c is a numerical value within a range from 0 to 255. Thus, when each of the pixels 48 includes the first sub-pixel 49R, the second sub-pixel 49G, and the third sub-pixel 49B as exemplified in the embodiment, the first sub-pixel 49R is supplied with a pixel signal corresponding to a of (R, G, B)=(a, b, c); the second sub-pixel 49G is supplied with a pixel signal corresponding to b of (R, G, B)=(a, b, c); and the third sub-pixel 49B is supplied with a pixel signal corresponding to c of (R, G, B)=(a, b, c). Thus, when the RGB gradation value indicated by the pixel data given to one of the pixels 48 is represented as (R, G, B)=(a, b, c), the largest value of a, b, and c corresponds to the maximum gradation value of the pixel 48.

In the embodiment, as described above regarding the first gamma converter 11, the RGB gradation value (input value) indicated by the pixel data given to the pixel 48 at a certain position by the input signal IP corresponding to one frame image is the same as the RGB gradation value (output value) indicated by the pixel data given to the pixel 48 by the output image signal OP based on the input signal IP. Thus, when Ic denotes the input value and g0(Ic) denotes the output value, an expression Ic=g0(Ic) holds, g0(Ic) can be represented in the form of the RGB gradation value, that is, (R, G, B)=(a, b, c).

As described above, the maximum gradation value identifier 12a identifies the maximum gradation value of each of the pixels 48. Therefore, the maximum gradation value identifier 12a individually performs processing to identify the largest value of a, b, and c in (R, G, B)=(a, b, c) as the maximum gradation value on each of the pieces of pixel data included in the output image signal OP corresponding to the one frame image.

The line memory selector 12b stores the maximum gradation values identified by the maximum gradation value identifier 12a as data for each line in the line memory LM. The line memory LM includes n line memories such as a first line memory, a second line memory, . . . , an nth line memory illustrated in FIG. 8. n is the number of the scan lines SCL. The n line memories included in the line memory LM are prepared as components that are coupled to the different scan lines SCL, and store and hold the maximum gradation values for the respective lines.

The maximum gradation value identifier 12a outputs data indicating the identified maximum gradation value to the line memory selector 12b. The line memory selector 12b transmits the data indicating the maximum gradation values to the first line memory, the second line memory, . . . , the nth line memory included in the line memory LM so as to store the data indicating the maximum gradation values of the pieces of the pixel data to addresses of the line memory LM corresponding to arrangement of the pixel data in the output image signal OP, that is, arrangement in the X-direction and the Y-direction of the pixels 48. The line memory LM stores and holds therein the data indicating the maximum gradation values.

The dimming gradation value determiner 12c performs determination processing based on the data indicating the maximum gradation values held in the line memory LM and the LUT 12e. The determination processing is processing to determine the dimming gradation value. The dimming gradation value is a value indicating the degree of transmission of light through the dimming pixel 148. The dimming gradation value determiner 12c individually performs the determination processing on each of the dimming pixels 148. Along with the description of the determination processing, the LUT 12e referred to in the determination processing will be described with reference to FIGS. 9 and 10.

Figure 9:
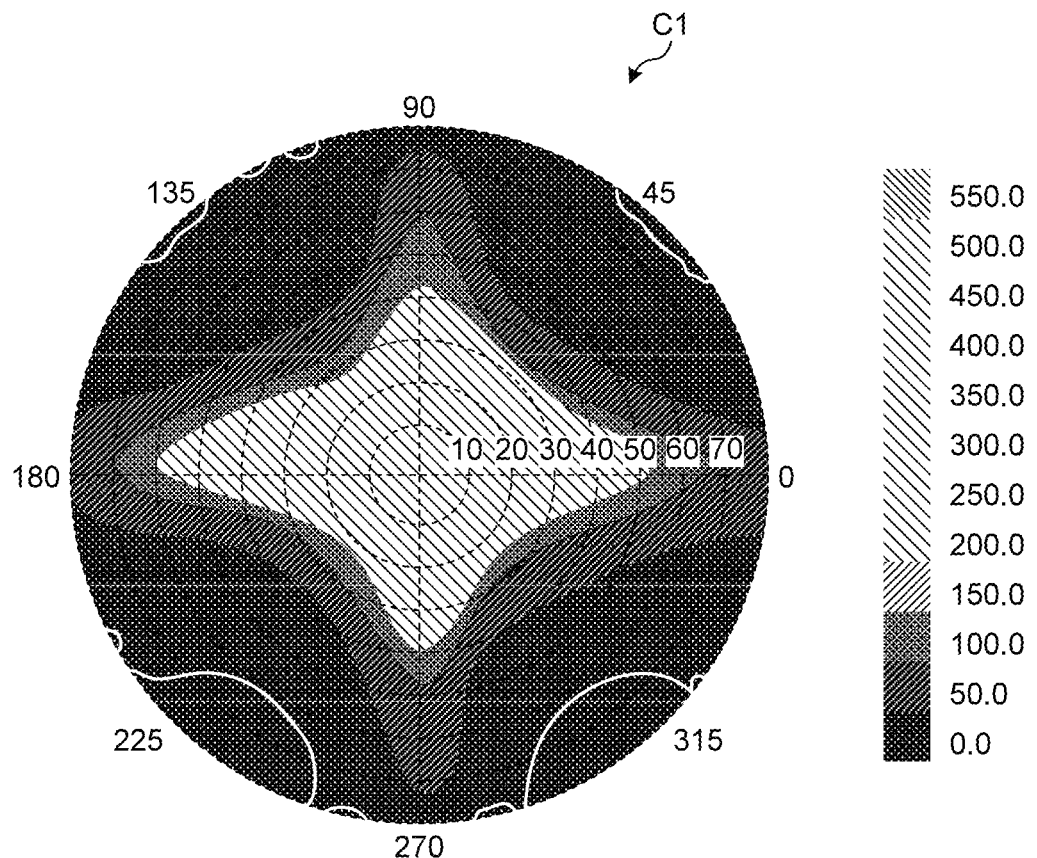
FIG. 9 is a diagram illustrating an example of viewing angle characteristics of the display panel.

FIG. 9 is a diagram illustrating an example of the viewing angle characteristics of the display panel 30. A viewing angle characteristic diagram C1 illustrated in FIG. 9 is a viewing angle characteristic diagram when the display panel 30 is, for example, an advanced fringe field switching (AFFS) system liquid crystal display panel.

Figure 13:
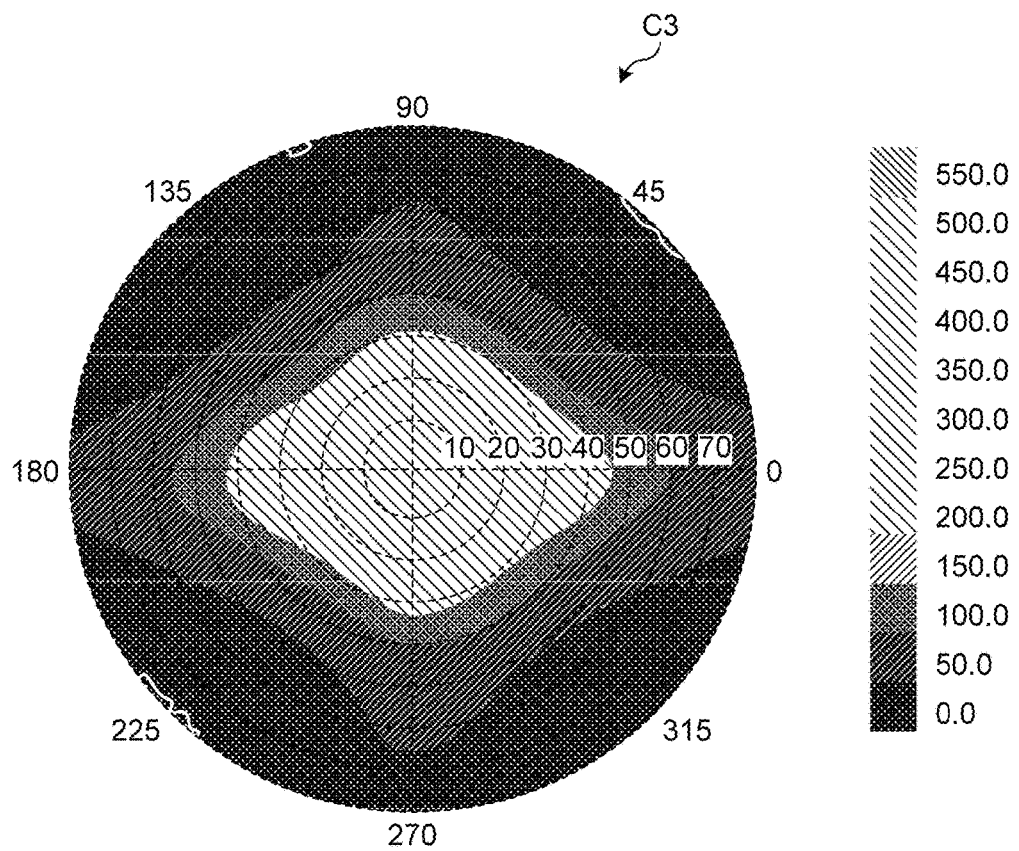
FIG. 13 is a diagram illustrating another example of the viewing angle characteristics of the display panel.

Viewing angle characteristic diagrams including the viewing angle characteristic diagram C1 illustrated in FIG. 9, a viewing angle characteristic diagram C2 illustrated in FIG. 11 to be described later, and a viewing angle characteristic diagram C3 illustrated in FIG. 13 each illustrate an angular range in which a contrast ratio (W:B) between the pixel 48 in a state of outputting the highest luminance (white: W) and the pixel 48 in a state of outputting the lowest luminance (black: B) is r:1. The relation between a pattern and a numerical value of r in each of the viewing angle characteristic diagrams corresponds to the relation between a pattern and a numerical value in a graph illustrated on the right side of the viewing angle characteristic diagram. The center of each of the viewing angle characteristic diagrams indicates the contrast ratio in the front view FV. The perimeter of the center indicates the contrast ratio in the oblique view DV. Numerical values "10", "20", "30", "40", "50", "60", and "70" illustrated on the right side of the center represent amounts of oblique view angles of the oblique views DV indicated by circles drawn with dashed lines so as to surround the center. Numerical values "0", "45", "90", "135", "180", "225", "270", and "315" illustrated around each of the viewing angle characteristic diagrams indicate positional relations between the user and the display panel 30 with reference to a face-to-face relation between the display panel 30 and the user in the front view FV. Specifically, the numerical values indicate the positional relations between the display panel 30 and the user on the assumption that "0" degrees represent a case where the user views the display panel 30 from a position moved to the right side from the reference with respect to the display panel 30 so as to obtain the oblique view DV. For example, the position "90" in each of the viewing angle characteristic diagrams indicates the oblique view DV by the user viewing the display panel 30 from the upper side the reference; the position "180" in each of the viewing angle characteristic diagrams indicates the oblique view DV by the user viewing the display panel 30 from the left side of the reference; and the position "270" in each of the viewing angle characteristic diagrams indicates the oblique view DV by the user viewing the display panel 30 from the lower side of the reference.

The X-direction is a direction obtained by connecting together "0" and "180" among the numerical values illustrated around each of the viewing angle characteristic diagrams. The Y-direction is a direction obtained by connecting together "90" and "270" among the numerical values illustrated around each of the viewing angle characteristic diagrams. The term "first oblique direction" refers to a direction obtained by connecting together "45" and "225" among the numerical values illustrated around each of the viewing angle characteristic diagrams. The term "second oblique direction" refers to a direction obtained by connecting together "135" and "315" among the numerical values illustrated around each of the viewing angle characteristic diagrams. The term "oblique direction" includes the first oblique direction and the second oblique direction.

As illustrated in FIG. 9, in the display panel 30 of the embodiment, when a range in which r≥200, that is, a range in which the contrast ratio between black (B) and white (W) is 200 or larger, is compared between the X-direction and the oblique direction, the range is wider in the X-direction. Specifically, in the X-direction, the range of r≥200 extends to the outside of a range in which the oblique view angle of the oblique view DV indicated by the circles drawn with the dashed lines so as to surround the center is 50 degrees, while, in the oblique direction, the range of r≥200 is limited to a smaller oblique view angle of below 50 degrees. When a range in which the contrast ratio between black (B) and white (W) is 200 or smaller is compared between the X-direction and the oblique direction, the range is also wider in the X-direction. In this manner, in the display panel 30 of the embodiment, the viewing angle in the X-direction of the display panel 30 is larger than the viewing angle in the oblique direction of the display panel 30.

As illustrated in FIG. 9, in the display panel 30 of the embodiment, when the range in which the contrast ratio between black (B) and white (W) is 200 or larger is compared between the Y-direction and the oblique direction, the range is wider in the Y-direction. When the range in which the contrast ratio between black (B) and white (W) is 200 or smaller is compared between the Y-direction and the oblique direction, the range is also wider in the Y-direction. In this manner, in the display panel 30 of the embodiment, the viewing angle in the Y-direction of the display panel 30 is larger than the viewing angle in the oblique direction of the display panel 30.

The LUT 12e referred to by the dimming gradation value determiner 12c in the determination processing is created in advance based on the above-described viewing angle characteristics of the display panel 30. Specifically, in the case of the determination of the degree of transmission of the light through the dimming pixel 148 that transmits the light from the light source device 50 that is lit as a light source for the pixel 48 that is lit corresponding to the maximum gradation value, the other dimming pixels 148 located around the dimming pixel 148 sharing the optical axis LL with the pixel 48 transmit the light based on the concept of the spatial processing described above.

As a basic concept of the spatial processing performed by the spatial processing arithmetic unit 12, as the dimming pixel 148 among the dimming pixels 148 arranged in a certain direction is located farther from the dimming pixel 148 sharing the optical axis LL with the pixel 48, the dimming gradation value is less affected based on the gradation value of the pixel 48. That is, the dimming gradation value of a predetermined one of the dimming pixels 148 located on the optical axis LL of the light that is emitted to the pixel 48 is determined based on the gradation value of the pixel 48, and the gradation value of the pixel 48 gives an influence on the degree of transmission of the light through the other dimming pixels 148 arranged around the dimming pixel 148. To reflect the influence to the dimming gradation values of the other dimming pixels 148 by arithmetic processing, a correction value to be described later is calculated. A correction coefficient to be used to calculate the correction value decreases as a separation distance from the predetermined dimming pixel 148 along one direction orthogonal to the optical axis LL increases. Hereinafter, the term simply called a "separation distance" refers to a distance from the predetermined dimming pixel 148, and to a distance along one direction orthogonal to the optical axis LL.

However, when the viewing angle in the X-direction of the display panel 30 is larger than the viewing angle in the oblique direction of the display panel 30 as in the embodiment, the degree of reduction in the correction coefficient with the increase in length in the X-direction of the separation distance is lower than the degree of reduction in the correction coefficient with the increase in length in the oblique direction of the separation distance. When the viewing angle in the Y-direction of the display panel 30 is larger than the viewing angle in the oblique direction of the display panel 30 as in the embodiment, the degree of reduction in the correction coefficient with the increase in length in the Y-direction of the separation distance is lower than the degree of reduction in the correction coefficient with the increase in length in the oblique direction of the separation distance. In this manner, in the spatial processing of the embodiment, the relation between the degree of reduction in the correction coefficient and the length of the separation distance along one of two directions (for example, the X-direction or the Y-direction) orthogonal to the optical axis LL shared by a pixel 48 and the predetermined dimming pixel 148 located corresponding to the location of the pixel 48 differs from the relation between the degree of reduction in the correction coefficient and the length of the separation distance along the other of the two directions orthogonal to the optical axis LL. The LUT 12e illustrated in FIG. 10 corresponds to such relations of the length of the separation distance with the degree of reduction in the correction coefficient.

FIG. 10 is a diagram illustrating an example of the LUT 12e. FIG. 10 and FIG. 12 to be described later illustrate the LUT 12e in a case where the number of bits (q bits) of the pixel data is eight (q=8).

In the embodiment, when the dimming gradation value determiner 12c determines the dimming gradation value of one of the dimming pixels 148, the dimming gradation value determiner 12c refers to the maximum gradation value of a predetermined one of the pixels 48 sharing the optical axis LL with the dimming pixel 148 and the maximum gradation values of the other pixels 48 arranged around the predetermined pixel 48. In the embodiment, with reference to the predetermined pixel 48, the pixels 48 located within a range of t pixels in each of the ±X-directions and the ±Y-directions are handled as the other pixels 48 arranged around the predetermined pixel 48. t is a natural number.

Hereinafter, the positional relation between the predetermined pixel 48 and the other pixels 48 will be indicated using coordinates. The coordinates of the predetermined pixel 48 are (x, y)=(0, 0). In the XY-plane view, (x, y)=(0, 0) are also coordinates of the predetermined dimming pixel 148. x is a coordinate in the X-direction of the pixel 48. y is a coordinate in the Y-direction of the pixel 48. Thus, the ranges of values of the coordinates that can be taken by the other pixels 48 are represented as −t≤x≤t, and −t≤y≤t. When t=6, the ranges of values of the coordinates that can be taken by the other pixels 48 are represented as −6≤x≤6, and −6≤y≤6. In the following description of the embodiment and in FIGS. 10, 12, 15, and 16, a case is exemplified where t=6. However, t may be smaller than 6 or larger than 6.

The dimming gradation value determiner 12c refers to the line memory LM and acquires the maximum gradation value of each of the predetermined pixel 48 and the other pixels 48. The maximum gradation value of the pixel 48 refers to the maximum gradation value of the gradation values for determining the intensities of the pixel signals to be supplied to the respective sub-pixels 49 included in the pixel 48. Specifically, the dimming gradation value determiner 12c acquires the maximum gradation value of the pixel 48 at (x, y)=(0, 0) as the maximum gradation value of the predetermined pixel 48. The dimming gradation value determiner 12c acquires the maximum gradation value of the pixel 48 at (x, y)=(−6, −6), the maximum gradation value of the pixel 48 at (x, y)=(−5, −6), the maximum gradation value of the pixel 48 at (x, y)=(−4, −6), . . . , the maximum gradation value of the pixel 48 at (x, y)=(−1, −6), the maximum gradation value of the pixel 48 at (x, y)=(−6, −5), the maximum gradation value of the pixel 48 at (x, y)=(−5, −5), . . . , the maximum gradation value of the pixel 48 at (x, y)=(6, 6) as the maximum gradation values of the other pixels 48.

The following describes a case where the maximum gradation values of the other pixels 48 acquired by the dimming gradation value determiner 12c include a value exceeding the maximum gradation value of the predetermined pixel 48. The term "exceeding gradation value" refers to a value among the maximum gradation values of the other pixels 48 exceeding the maximum gradation value of the predetermined pixel 48. The term "coordinates of the exceeding gradation value" refers to the coordinates of one of the other pixels 48 from which the exceeding gradation value has been acquired. The dimming gradation value determiner 12c calculates a difference value obtained by subtracting the maximum gradation value of the predetermined pixel 48 from one exceeding gradation value. When $Is_{x,y}$ denotes the one exceeding gradation value, and $Ic_{max}$ denotes the maximum gradation value of the predetermined pixel 48, the dimming gradation value determiner 12c calculates $Is_{x,y} - Ic_{max}$ as the difference value. Hereinafter, the term simply called a "difference value" refers to $Is_{x,y} - Ic_{max}$. The dimming gradation value determiner 12c calculates, as the correction value, a value obtained by multiplying the calculated difference value by the correction coefficient for the coordinates of the exceeding gradation value. Hereinafter, the term simply called a "correction coefficient" refers to the correction coefficient for the coordinates of the exceeding gradation value. The correction coefficient is determined with reference to the LUT 12e. The LUT 12e represents, using the x-coordinate and the y-coordinate, the positional relation with the coordinates of the predetermined dimming pixel 148, that is, (x, y)=(0, 0). A field is set at each different set of coordinates within a range of −t≤x≤t, and −t≤y≤t, and a value corresponding to the correction coefficient is stored in each field.

The LUT illustrated in FIG. 10 and FIG. 12 to be described later is an LUT for a two-dimensional array. Fields the number of which corresponds to the number of sets of coordinates of the other pixels 48 corresponding to t values in each of the ±X-directions and the ±Y-directions are set in the LUT. In the LUT, the position in the vertical direction corresponds to the y-coordinate, and the position in the horizontal direction corresponds to the x-coordinate. For example, a value of "246" is set in a field at (x, y)=(−2, 0) and a field at (x, y)=(2, 0). In addition, a value of "241" is set in a field at (x, y)=(−1, −1), a field at (x, y)=(−1, 1), a field at (x, y)=(1, −1), and a field at (x, y)=(1, 1). The other fields are not described in detail. However, as illustrated in FIG. 10, in the LUT 12e, the degree of reduction in the value of the field with the increase in length of the separation distance (degree of separation of coordinates) in the X-direction with respect to (x, y)=(0, 0) corresponding to the location of the predetermined pixel 48 is lower than the degree of reduction in the value of the field with the increase in length of the separation distance (degree of separation of coordinates) in the oblique direction. In the LUT 12e, the degree of reduction in the value of the field with the increase in length of the separation distance (degree of separation of coordinates) in the Y-direction with respect to (x, y)=(0, 0) corresponding to the location of the predetermined pixel 48 is lower than the degree of reduction in the value of the field with the increase in length of the separation distance (degree of separation of coordinates) in the oblique direction.

The correction coefficient determined with reference to the LUT illustrated in FIG. 10 and FIG. 12 to be described later has a value obtained by dividing a value stored in a field for the coordinates of the exceeding gradation value by a value stored in the field at (x, y)=(0, 0). The field at (x, y)=(0, 0) stores the maximum value of q bits (for example, 255 in the case of eight bits). Thus, when, for example, the coordinates of the exceeding gradation value are (x, y)=(−2, 0) or (x, y)=(2, 0), the correction coefficient is determined to be "246/255" with reference to the LUT of FIG. 10. When the coordinates of the exceeding gradation value are (x, y)=(−1, −1), (x, y)=(−1, 1), (x, y)=(1, −1), or (x, y)=(1, 1), the correction coefficient is determined to be "241/255" with reference to the LUT of FIG. 10. In this manner, the LUT 12e serves as data indicating the correction coefficient corresponding to the positional relation with (x, y)=(0, 0).

When $e[PS_{x,y} - Pc]$ denotes the correction coefficient for the coordinates of the exceeding gradation value, a correction value ($f_{x,y}$) obtained by multiplying the difference value by the correction coefficient can be represented by Expression (1) below. Hereinafter, the term simply called a "correction value" refers to $f_{x,y}$.

$$f_{x,y} = e[PS_{x,y} - Pc] \times |(Is_{x,y} - Ic_{max})| \qquad (1)$$

In determining the dimming gradation value of one of the dimming pixels 148, when a plurality of the exceeding gradation values are present, the dimming gradation value determiner 12c calculates the correction value of each of the exceeding gradation values.

When, instead, the maximum gradation values of the other pixels 48 acquired by the dimming gradation value determiner 12c do not include the exceeding gradation value, the dimming gradation value determiner 12c sets the correction value to zero. That is, $f_{x,y}=0$ in this case.

The dimming gradation value determiner 12c identifies a value corresponding to the maximum value of the correction values as a maximum correction value (A). In determining the dimming gradation value of one of the dimming pixels 148, when one or more of the exceeding gradation values are present, the maximum value of the calculated correction values is handled as the maximum correction value (A). That is, $A=\max(f_{x,y})$. When, instead, the maximum gradation values of the other pixels 48 do not include the exceeding gradation value, $f_{x,y}=0$ as described above, so that A=0.

The dimming gradation value determiner 12c calculates a value obtained by adding the maximum correction value (A) to the maximum gradation value ($Ic_{max}$) of the predetermined pixel 48, as the dimming gradation value of one dimming pixel 148 sharing the optical axis LL with the predetermined pixel 48. That is, the dimming gradation value can be represented as $Ic_{max}+A$. The dimming gradation value determiner 12c calculates the dimming gradation value of each of the dimming pixels 148.

As described above, in the LUT 12*e*, the degree of reduction in the value of the field with the increase in length of the separation distance (degree of separation of coordinates) in the X-direction with respect to (x, y)=(0, 0) corresponding to the location of the predetermined pixel 48 is lower than the degree of reduction in the value of the field with the increase in length of the separation distance (degree of separation of coordinates) in the oblique direction. In the LUT 12*e*, the degree of reduction in the value of the field with the increase in length of the separation distance (degree of separation of coordinates) in the Y-direction with respect to (x, y)=(0, 0) corresponding to the location of the predetermined pixel 48 is lower than the degree of reduction in the value of the field with the increase in length of the separation distance (degree of separation of coordinates) in the oblique direction. Therefore, when the exceeding gradation value is present, the maximum correction value (A) is larger in a case where the position of the other pixel 48 serving as a basis of the maximum correction value is located in the X-direction (or Y-direction) with respect to the predetermined pixel 48 than in a case where the position thereof is located in the oblique direction. In other words, comparing the other pixel 48 the position of which is separated from the predetermined pixel 48 in the X-direction (or Y-direction) by a certain separation distance and the other pixel 48 the position of which is separated from the predetermined pixel 48 in the oblique direction by the same separation distance as the certain separation distance, the degree of reduction in the maximum correction value (A) with the increase in the separation distance is lower in the X-direction (or Y-direction) than in the oblique direction.

The correction coefficient for each set of coordinates of the LUT 12*e* corresponds to the degree of transmission of the light through the dimming pixel 148 at each set of coordinates when the display device 1 performs operation corresponding to a verification pattern. The term "verification pattern" refers to the input signal IP that causes the pixel 48 at (x, y)=(0, 0) to produce an output at the highest luminance (for example, an output corresponding to white of (R, G, B)=(255, 255, 255)), and causes the pixels 48 at the other sets of coordinates to produce an output at the lowest luminance (for example, an output corresponding to black of (R, G, B)=(0, 0, 0)). That is, in the display device 1, when one of the pixels 48 produces the output at the highest luminance and the other pixels 48 produce the output at the lowest luminance to the display panel 30, the light is transmitted through the predetermined dimming pixel 148 located on the optical axis of the light that is emitted to the one of the pixels 48 and through the other dimming pixels 148 arranged around the predetermined dimming pixel 148. The degree of transmission of the light through the other dimming pixels 148 decreases as the light is away along one direction from the predetermined dimming pixel 148, and there are a plurality of directions having different degrees of the decrease. In the example illustrated in FIG. 8, the LUT 12*e* is stored in the ROM 12*d*. The ROM 12*d* is a non-rewritable storage circuit. However, the LUT 12*e* may be stored in a rewritable storage circuit such as a flash memory or an electrically erasable programmable read-only memory (EEPROM).

The second gamma converter 13 illustrated in FIG. 6 performs the gamma correction processing when the gamma correction is required for the dimming gradation value. In the embodiment, the second gamma converter 13 performs the gamma correction processing such that a gamma curve between a case where both the dimming panel 80 and the display panel 30 are at the lowest gradation (0) and a case where both the dimming panel 80 and the display panel 30 are at the highest gradation (255 in the case of eight bits) is a desired gamma curve (for example, a gamma curve corresponding to a gamma value of 2.2). When g1 denotes a coefficient used in the gamma correction, the dimming gradation value after the gamma correction processing is performed by the second gamma converter 13 can be represented as $g1\,(Ic_{max}+A)$.

The first gamma converter 11 illustrated in FIG. 6 outputs the output image signal OP to the display panel 30. The output image signal OP is a set of the values g0(Ic) described above for the respective pixels 48. Each of the pixels 48 is driven in accordance with the value g0(Ic) by operation of the display panel driver 40. The second gamma converter 13 outputs the dimming signal DI to the dimming panel 80. The dimming signal DI is a set of the values $g1(Ic_{max}+A)$ described above for the respective dimming pixels 148. Each of the dimming pixels 148 is driven in accordance with the value $g1(Ic_{max}+A)$ by operation of the dimming panel driver 140. That is, the dimming panel 80 operates such that the degree of transmission of the light through each of the dimming pixels 148 corresponds to the dimming gradation value thereof. In the embodiment, all the sub-pixels 49 included in one of the dimming pixels 148 are driven such that each of the sub-pixels 49 has a degree of transmission of light corresponding to the dimming gradation value of the one of the dimming pixels 148. As a result, the frame image corresponding to the input signal IP is displayed in the display area OA, and the dimming pixels 148 subjected to the spatial processing of the "embodiment" described with reference to FIG. 7 is controlled. Thus, in either of the front view FV and the oblique view DV, the user can view the frame image corresponding to the input signal IP with sufficient accuracy.

As described above, according to the embodiment, the display device 1 includes the display panel 30 and the dimming panel 80. The display panel 30 includes the pixels 48. The dimming panel 80 is disposed between the display panel 30 and the light source (light source device 50) of the light to be emitted to the display panel 30 and includes the dimming pixels 148. The degree of transmission of the light through the predetermined dimming pixel 148 located on the optical axis LL of the light that is emitted to the pixel 48 is determined based on the gradation value of the pixel 48, and the gradation value is referred to in the calculation of the correction value for correcting the degree of transmission of the light through the other dimming pixels 148 arranged around the predetermined dimming pixel 148. The correction coefficient that is used in the calculation of the correction value decreases as the separation distance increases along one direction orthogonal to the optical axis LL. The separation distance is a distance from the predetermined dimming pixel 148 to each of the other dimming pixels 148 for which the correction value is calculated. Directions along a plane (XY-plane) orthogonal to the optical axis LL include a plurality of directions (for example, a direction oblique to the X-direction and a direction oblique to the Y-direction) having different relations between the length of the separation distance and the degree of reduction in the correction coefficient. The occurrence of the double image caused by the spatial processing can be reduced by "correcting the degree of transmission of the light through the other dimming pixels 148 arranged around the predetermined dimming pixel 148". In addition, the viewing angle characteristics of a liquid crystal panel cannot be fully uniform in all directions orthogonal to the optical axis LL in reality. Therefore, the relation between the length of the separation distance along one of the two directions orthogonal to the optical axis LL and the degree of reduction in the correction coefficient is made different from the relation between the length of the separation distance along the other of the two directions orthogonal to the optical axis LL and the degree of reduction in the correction coefficient, whereby it is possible to make the control of the degree of dimming appropriate for the viewing angle characteristics of the display panel 30. Thus, the dimming panel 80 can perform the dimming while restraining the display quality from deteriorating.

The degree of reduction in the correction coefficient with respect to the length of the separation distance is lower in one of the two directions (for example, the X-direction or the Y-direction) orthogonal to the optical axis LL than in the other of the two directions (for example, the oblique direction) orthogonal to the optical axis LL, and the viewing angle in the one of the two directions of the display panel is larger than the viewing angle in the other of the two directions of the display panel. With this configuration, the control of the degree of dimming can be more accurately appropriate for the viewing angle characteristics of the display panel 30.

The pixel 48 includes the sub-pixels 49, and the respective sub-pixels 49 include the color filters (filter films 26) for transmitting light in different colors. The dimming pixel 148 is provided for each of the pixels 48. This configuration allows the dimming pixel 148 to control the degree of dimming for each of the pixels 48.

In the dimming pixel 148, one or more components (the sub-pixels 49 included in the dimming pixel 148) capable of individually controlling the degree of transmission of light are provided for each of the pixels. This configuration allows the dimming pixel 148 to more reliably control the degree of dimming for each of the pixels 48.

The display device 1 includes the light source (light source device 50). This configuration allows the display device 1 to display the image without requiring an external light source.

One of the "two directions orthogonal to the optical axis LL" serving as a direction in which the above-described separation distance is determined, is a horizontal synchronization direction (X-direction) of the display panel 30 or a vertical synchronization direction (Y-direction) of the display panel 30. Therefore, the control of the degree of dimming can be performed which is appropriate for the display panel 30 having a better viewing angle in the horizontal synchronization direction (X-direction) of the display panel 30 or the vertical synchronization direction (Y-direction) of the display panel 30 than in the other direction.

The degree of transmission of the light through each of the dimming pixels 148 is controlled based on the data (for example, the LUT 12e) indicating the relation between the length of the separation distance and the degree of reduction in the correction coefficient. As a result, the dimming control can be more accurately performed by preparing in advance the data appropriate for the viewing angle characteristics of the display panel 30.

The display device 1 includes a control circuit (spatial processing arithmetic unit 12) that holds the above-described data (for example, the LUT 12e). The control circuit determines the degree of transmission of the light through each of the dimming pixels 148 based on the gradation value of each of the pixels 48 indicated by the image signal (input signal IP) supplied to the display panel 30 and on the data.

As a result, the dimming control appropriate for the display output content can be more accurately performed.

Modifications

The following describes modifications of the embodiment with reference to FIGS. 11 to 18. In the description of the modifications, the same components as those of the embodiment may be denoted using the reference numerals and may not be described.

First Modification

A first modification of the embodiment will first be described with reference to FIGS. 11 to 13.

Figure 11:
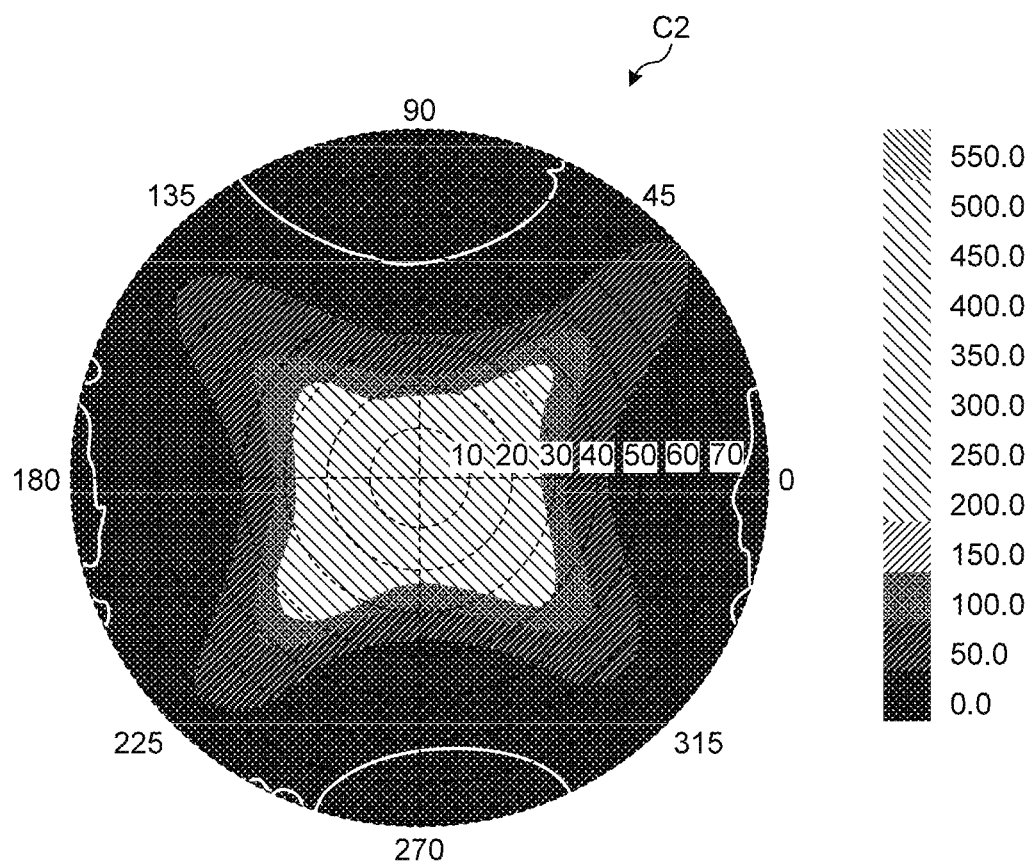
FIG. 11 is a diagram illustrating an example of the viewing angle characteristics of the display panel in a first modification.

FIG. 11 is a diagram illustrating an example of the viewing angle characteristics of the display panel 30 in the first modification. The viewing angle characteristic diagram C2 illustrated in FIG. 11 is a viewing angle characteristic diagram when the display panel 30 is what is called a twisted nematic (TN) system liquid crystal display panel.

As illustrated in FIG. 11, in the display panel 30 of the first modification, when the range in which r≥200, that is, the range in which the contrast ratio between black (B) and white (W) is 200 or larger is compared between the X-direction and the oblique direction, the range is wider in the oblique direction. Specifically, in the oblique direction, the range of r≥200 extends to the outside of a range in which the oblique view angle of the oblique view DV indicated by the circles drawn with the dashed lines so as to surround the center is 30 degrees, while, in the X-direction, the range in which r≥200 is limited to a smaller oblique view angle of below 30 degrees. When the range in which the contrast ratio between black (B) and white (W) is 200 or smaller is compared between the X-direction and the oblique direction, the range is also wider in the oblique direction. In this manner, in the display panel 30 of the first modification, the viewing angle in the oblique direction of the display panel 30 is larger than the viewing angle in the X-direction of the display panel 30.

As illustrated in FIG. 11, in the display panel 30 of the first modification, when the range in which the contrast ratio between black (B) and white (W) is 200 or larger is compared between the Y-direction and the oblique direction, the range is wider in the oblique direction. When the range in which the contrast ratio between black (B) and white (W) is 200 or smaller is compared between the Y-direction and the oblique direction, the range is also wider in the oblique direction. In this manner, in the display panel 30 of the first modification, the viewing angle in the oblique direction of the display panel 30 is larger than the viewing angle in the Y-direction of the display panel 30.

FIG. 12 is a diagram illustrating an example of the LUT 12e in the first modification. In the first modification, as illustrated in FIG. 12, a value of "211" is set in a field at (x, y)=(−2, −2), a field at (x, y)=(−2, 2), a field at (x, y)=(2, −2), and a field at (x, y)=(2, 2). In addition, a value of "111" is set in a field at (x, y)=(−2, 0) and a field at (x, y)=(2, 0). The other fields are not described in detail. However, as illustrated in FIG. 12, in the LUT 12e, the degree of reduction in the value of the field with the increase in length of the separation distance (degree of separation of coordinates) in the oblique direction with respect to (x, y)=(0, 0) corresponding to the location of the predetermined pixel 48 is lower than the degree of reduction in the value of the field with the increase in length of the separation distance (degree of separation of coordinates) in the X-direction. In the LUT 12e, the degree of reduction in the value of the field with the increase in length of the separation distance (degree of separation of coordinates) in the oblique direction with respect to (x, y)=(0, 0) corresponding to the location of the predetermined pixel 48 is lower than the degree of reduction in the value of the field with the increase in length of the separation distance (degree of separation of coordinates) in the Y-direction.

The processing performed by the dimming gradation value determiner 12c in the first modification is the same as that in the embodiment. That is, the dimming gradation value determiner 12c calculates the value obtained by adding the maximum correction value (A) to the maximum gradation value ($Ic_{max}$) of the predetermined pixel 48 as the dimming gradation value of one dimming pixel 148 sharing the optical axis LL with the predetermined pixel 48.

Thus, in the case of the first modification, when the exceeding gradation value is present, the maximum correction value (A) is larger in a case where the position of the other pixel 48 serving as a basis of the maximum correction value is located in the oblique direction with respect to the predetermined pixel 48 than in a case where the position thereof is located in the X-direction (or Y-direction). In other words, comparing the other pixel 48 the position of which is separated from the predetermined pixel 48 in the oblique direction by a certain separation distance and the other pixel 48 the position of which is separated from the predetermined pixel 48 in the X-direction (or Y-direction) by the same separation distance as the certain separation distance, the degree of reduction in the maximum correction value (A) with the increase in the separation distance is lower in the oblique direction than in the X-direction (or Y-direction).

In this manner, in the first modification, the content of the LUT 12e is changed depending on the viewing angle characteristics (refer to FIG. 11) of the display panel 30 different from the viewing angle characteristics (refer to FIG. 9) of the display panel 30 according to the embodiment. As described above, the first modification is the same as the embodiment except for the respects otherwise explained. As exemplified in the embodiment and the first modification, the display device 1 according to the present disclosure employs the LUT 12e appropriate for the viewing angle characteristics of the display panel 30, thereby allowing the user to view the frame image corresponding to the input signal IP with sufficient accuracy in either of the front view FV and the oblique view DV. Thus, the dimming panel 80 can perform the dimming while restraining the display quality from deteriorating.

According to the first modification described with reference to FIGS. 10 and 11, one of the "two directions orthogonal to the optical axis LL" serving as the direction in which the above-described separation distance is determined, is neither the horizontal synchronization direction (X-direction) of the display pane nor the vertical synchronization direction (Y-direction) of the display panel. Therefore, the control of the degree of dimming can be performed which is appropriate for the display panel 30 having a better viewing angle in a direction other than the horizontal synchronization direction (X-direction) of the display panel 30 and the vertical synchronization direction (Y-direction) of the display panel 30.

The viewing angle characteristics of the display panel 30 that can be supported by the display device 1 of the present disclosure is not limited to the examples illustrated in FIGS. 9 and 11. FIG. 13 is a diagram illustrating another example of the viewing angle characteristics of the display panel 30. The LUT 12e corresponding to FIG. 13 is not illustrated. However, even for the display panel 30 that exhibits the viewing angle characteristics, such as those illustrated in FIG. 13, different from the viewing angle characteristics illustrated in FIGS. 9 and 11, the same effect as that of the embodiment and the first modification can be obtained by employing the LUT 12e having content appropriate for the viewing angle characteristics of the display panel 30.

Second Modification

Figure 14:
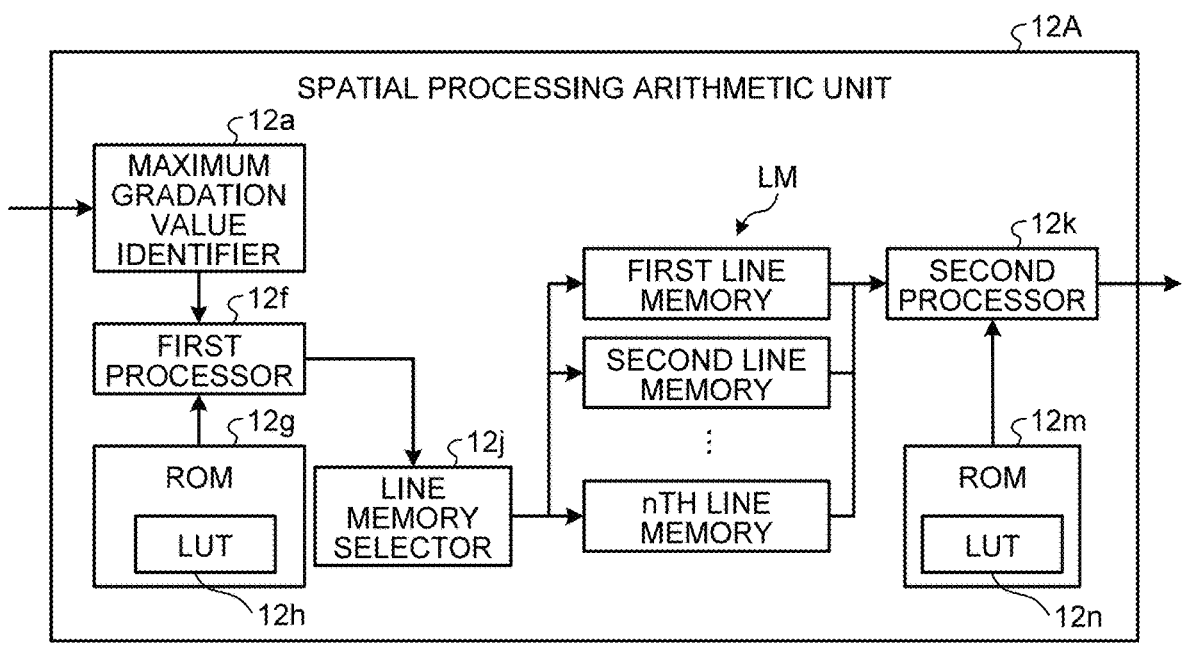
FIG. 14 is a block diagram illustrating a main configuration example of a spatial processing arithmetic unit in a second modification.

The following describes a second modification of the embodiment with reference to FIGS. 14 to 16. In the second modification, the spatial processing arithmetic unit 12 according to the embodiment is replaced with a spatial processing arithmetic unit 12A to be described later.

FIG. 14 is a block diagram illustrating a main configuration example of the spatial processing arithmetic unit 12A in the second modification. The spatial processing arithmetic unit 12A includes, for example, the maximum gradation value identifier 12a, a first processor 12f, a ROM 12g, a line memory selector 12j, the line memory LM, a second processor 12k, and a ROM 12m. The maximum gradation value identifier 12a of the second modification has the same configuration as that of the maximum gradation value identifier 12a of the embodiment.

The first processor 12f performs first processing. The first processing refers to processing to determine a temporary value of the dimming gradation value to be applied to the dimming pixel 148 based on the maximum gradation value of the pixel 48 sharing the optical axis LL with the dimming pixel 148 and the maximum gradation values of the other pixels 48 arranged around the pixel 48.

Specifically, the first processor 12f temporarily stores the maximum gradation value output by the maximum gradation value identifier 12a, and acquires the maximum gradation values of the predetermined pixel 48 and "some of the other pixels 48 arranged in the X-direction". The maximum gradation values of "some of the other pixels 48 arranged in the X-direction" refer to the maximum gradation values of "the other pixels 48 that are arranged in the X-direction with respect to the predetermined pixel 48 and are located within a range of t pixels in each of the ±X-directions with respect to the predetermined pixel 48" acquired by the first processor 12f. That is, unlike the dimming gradation value determiner 12c, the first processor 12f does not acquire the maximum gradation values of "the other pixels 48 located in positions in the Y-direction different from that of the predetermined pixel 48" among the maximum gradation values of the other pixels 48 in order to calculate the temporary value of the dimming gradation value to be applied to the dimming pixel 148 sharing the optical axis LL with the predetermined pixel 48. Hereinafter, the term simply called a "temporary value" refers to the temporary value of the dimming gradation value.

The following describes a case where the maximum gradation values of "some of the other pixels 48 arranged in the X-direction" acquired by the first processor 12f include the exceeding gradation value. The first processor 12f calculates a first difference value obtained by subtracting the maximum gradation value of the predetermined pixel 48 from one exceeding gradation value. When $Is_x$ denotes the one exceeding gradation value, and $Ic_{max}$ denotes the maximum gradation value of the predetermined pixel 48, the first processor 12f calculates $Is_x - Ic_{max}$ as the first difference value. Hereinafter, the term simply called a "first difference value" refers to $Is_x - Ic_{max}$. The first processor 12f calculates, as a first correction value, a value obtained by multiplying the calculated first difference value by a first correction coefficient for the coordinates of the exceeding gradation value. Hereinafter, the term simply called a "first correction coefficient" refers to the first correction coefficient for the coordinates of the exceeding gradation value. The first correction coefficient is determined with reference to a LUT 12h held in the ROM 12g.

FIG. 15 is a diagram illustrating an example of the LUT 12h. The LUT illustrated in FIG. 15 is a LUT for a one-dimensional array. Fields the number of which corresponds to the number of sets of coordinates of the other pixels 48 corresponding to t values in each of the ±X-directions are set in the LUT. The position in the horizontal direction in the LUT corresponds to the x-coordinate. All the y-coordinates are handled as zero. For example, a value of "0.5" is set in a field at (x, y)=(−1, 0) and a field at (x, y)=(1, 0).

The first correction coefficient determined with reference to the LUT illustrated in FIG. 15 is a value stored in a field for the coordinates of the exceeding gradation value. Thus, for example, when the coordinates of the exceeding gradation value are (x, y)=(−1, 0) or (x, y)=(1, 0), the first correction coefficient determined with reference to the LUT of FIG. 15 is "0.5".

When $eh[PS_x-Pc]$ denotes the first correction coefficient for the coordinates of the exceeding gradation value, the first correction value ($f_x$) obtained by multiplying the first difference value by the first correction coefficient can be represented by Expression (2) below. Hereinafter, the term simply called a "first correction value" refers to $f_x$.

$$f_x = eh[PS_x - Pc] \times |(Is_x - Ic_{max})| \qquad (2)$$

In determining the temporary value for one of the dimming pixels 148, if a plurality of the exceeding gradation values are present, the first processor 12f calculates the first correction value for each of the exceeding gradation values.

If the maximum gradation values of "some of the other pixels 48 arranged in the X-direction" acquired by the first processor 12f do not include the exceeding gradation value, the first processor 12f sets the first correction value to zero. That is, $f_x=0$ in this case.

The first processor 12f identifies a value corresponding to the maximum value of the first correction values as a first maximum correction value (B). In determining the dimming gradation value of one of the dimming pixels 148, when one or more of the exceeding gradation values are present, the maximum value of the calculated first correction values is handled as the first maximum correction value (B). That is, B=max($f_x$). When, instead, the maximum gradation values of the other pixels 48 do not include the exceeding gradation value, $f_x=0$ as described above, so that B=0.

The first processor 12f calculates a value obtained by adding the first maximum correction value (B) to the maximum gradation value ($Ic_{max}$) of the predetermined pixel 48, as the temporary value for one dimming pixel 148 sharing the optical axis LL with the predetermined pixel 48. That is, the temporary value can be represented as $Ic_{max}$+B. The first processor 12f calculates the temporary value for each of the dimming pixels 148.

The line memory selector 12j stores the temporary value for each of the dimming pixels 148 calculated by the first processor 12f as data for each line in the line memory LM. The line memory LM of the second modification may be physically or functionally the same as the line memory LM of the embodiment, but differs from that of the embodiment in that the data stored therein is the temporary value for each of the dimming pixels 148. The line memory selector 12j transmits the data indicating the temporary values to the first line memory, the second line memory, . . . , the nth line memory included in the line memory LM so as to store the data indicating the maximum gradation values of respective pieces of the pixel data at addresses of the line memory LM corresponding to the arrangement of the dimming pixels 148 in the X-direction and Y-direction. The line memory LM stores and holds therein the data indicating the temporary values.

The second processor 12k performs second processing based on the data indicating the temporary values held in the line memory LM and on an LUT 12n. The second processing is processing to determine the dimming gradation value. The second processor 12k individually performs the determination processing on each of the dimming pixels 148.

Specifically, the second processor 12k acquires the temporary values for one of the dimming pixels 148 and "some of the other dimming pixels 148 arranged in the Y-direction" with reference to the line memory LM. In the processing of the second processor 12k, the term "particular dimming pixel 148" refers to the dimming pixel 148 handled as one dimming pixel 148 sharing the optical axis LL with the predetermined pixel 48 in the processing of the first processor 12f. The temporary values for "some of the other dimming pixels 148 arranged in the Y-direction" acquired by the second processor 12k refer to the temporary values for "the other dimming pixels 148 that are arranged in the Y-direction with respect to the particular dimming pixel 148 and are located within a range of t pixels in each of the ±Y-directions with respect to the particular dimming pixel 148".

The following describes a case where the temporary values for "some of the other dimming pixels 148 arranged in the Y-direction" acquired by the second processor 12k include a value exceeding the temporary value for the particular dimming pixel 148. The term "exceeding temporary value" refers to a value, among the temporary values for "some of the other dimming pixels 148 arranged in the Y-direction", exceeding the temporary value of the particular dimming pixel 148. The term "coordinates of the exceeding temporary value" refers to the coordinates of the other dimming pixel 148 of which the exceeding temporary value has been acquired.

The second processor 12k calculates a second difference value obtained by subtracting the temporary value for the particular dimming pixel 148 from one exceeding temporary value. When $Hs_y$ denotes the one exceeding temporary value, and Hc denotes the temporary value for the particular dimming pixel 148, the second processor 12k calculates $Hs_y$−Hc as the second difference value. Hereinafter, the term simply called a "second difference value" refers to $Hs_y$−Hc.

The second processor 12k calculates, as a second correction value, a value obtained by multiplying the calculated second difference value by a second correction coefficient for the coordinates of the temporary value. Hereinafter, the term simply called a "second correction coefficient" refers to the second correction coefficient for the coordinates of the temporary value. The second correction coefficient is determined with reference to the LUT 12n held in the ROM 12m.

FIG. 16 is a diagram illustrating an example of the LUT 12n. The LUT illustrated in FIG. 16 is a LUT for a one-dimensional array. Fields the number of which corresponds to the number of sets of coordinates of the other dimming pixels 148 corresponding to t values in each of ±Y-directions are set in the LUT. The position in the horizontal direction in the LUT corresponds to the y-coordinate. All the x-coordinates are handled as zero. For example, a value of "0.4" is set in a field at (x, y)=(0, −1) and a field at (x, y)=(0, 1).

The second correction coefficient determined with reference to the LUT illustrated in FIG. 16 is a value stored in a field for the coordinates of the temporary value. Thus, for example, when the coordinates of the temporary value are (x, y)=(0, −1) or (x, y)=(0, 1), the second correction coefficient determined with reference to the LUT of FIG. 16 is "0.4".

When $ev[PS_y-Pc]$ denotes the second correction coefficient for the coordinates of the exceeding gradation value, the second correction value ($f_y$) obtained by multiplying the second difference value by the second correction coefficient can be represented by Expression (3) below. Hereinafter, the term simply called a "second correction value" refers to $f_y$.

$$f_y = ev[PS_y - Pc] \times |(Hs_y - Hc)| \qquad (3)$$

In determining the dimming gradation value of the particular dimming pixel 148, when a plurality of the exceeding temporary values are present, the second processor 12k calculates the second correction value for each of the exceeding temporary values.

When the temporary values for "some of the other dimming pixels 148 arranged in the Y-direction" acquired by the second processor 12k do not include the exceeding temporary value, the second processor 12k sets the second correction value to zero. That is, $f_y=0$ in this case.

The second processor 12k identifies a value corresponding to the maximum value of the second correction values as a second maximum correction value (C). In determining the dimming gradation value of the particular dimming pixel 148, when one or more of the exceeding temporary values are present, the maximum value of the calculated second correction values is handled as the second maximum correction value (C). That is, $C=\max(f_y)$. When, instead, the temporary values for the other dimming pixels 148 do not include the exceeding temporary value, $f_y=0$ as described above, so that C=0.

The second processor 12k calculates, as the dimming gradation value of the particular dimming pixel 148, a value obtained by adding the second maximum correction value (C) to the temporary value (Hc) for the particular dimming pixel 148. That is, the dimming gradation value can be represented as Hc+C. The second processor 12k calculates the dimming gradation value of each of the dimming pixels 148.

The degree of reduction in the value of the field with the increase in length of the separation distance (degree of separation of coordinates) in the X-direction with respect to (x, y)=(0, 0) corresponding to the location of the predetermined pixel 48 in the LUT 12h illustrated in FIG. 15 is lower than the degree of reduction in the value of the field with the increase in length of the separation distance (degree of separation of coordinates) in the Y-direction with respect to (x, y)=(0, 0) corresponding to the location of the particular dimming pixel 148 in the LUT 12n illustrated in FIG. 16. Thus, in the second modification, comparing the position separated from the predetermined pixel 48 in the X-direction by a certain separation distance and the position separated from the predetermined pixel 48 in the Y-direction by the same separation distance as the certain separation distance, the degree of reduction in the maximum correction value (B) with the increase in the separation distance in the X-direction is lower than the degree of reduction in the maximum correction value (C) with the increase in the separation distance in the Y-direction. In other words, the second modification employs the display panel 30 that exhibits the viewing angle characteristics corresponding to such a relation between the separation distance and the maximum correction value. If the viewing angle characteristics of the display panel 30 are different viewing angle characteristics, the content of the LUTs described with reference to FIGS. 15 and 16 is also different content of the LUTs that is appropriate for the viewing angle characteristics.

In the second modification, values directly usable as the first correction coefficient and the second correction coefficient are stored in the fields of each of the LUTs. However, this is merely an example, and the present disclosure is not limited thereto. Also in the second modification, using the same mechanism as that of the calculation of the correction coefficient in the LUT 12e of the embodiment, values based on the number of bits may be stored in the field and divided by a value stored in the field at (x, y)=(0, 0) to calculate the first correction coefficient and the second correction coefficient. Conversely, in the embodiment, a value directly usable as the correction coefficient may be stored in each field of the LUT to be referred to by the dimming gradation value determiner 12c.

In the description with reference to FIGS. 14 to 16 described above, the first processor 12f performs the processing based on the separation distance in the X-direction, and then, the second processor 12k performs the processing based on the separation distance in the Y-direction. However, the order of the processing may be reversed. That is, the maximum gradation values of "some of the other pixels 48 arranged in the X-direction" acquired by the first processor 12f may be replaced with the maximum gradation values of "some of the other pixels 48 arranged in the Y-direction", and the temporary values for "some of the other dimming pixels 148 arranged in the Y-direction" acquired by the second processor 12k may be replaced with the temporary values for "some of the other dimming pixels 148 arranged in the X-direction". In that case, the content of the LUT 12h (refer to FIG. 15) is replaced with the content of the LUT 12n (refer to FIG. 16), and the content of the LUT 12n (refer to FIG. 16) is replaced with the content of the LUT 12h (refer to FIG. 15).

The ROM 12g and the ROM 12m are the same as the ROM 12d except that the stored content of the LUTs differs from that of the LUT 12e. As described above, the second modification is the same as the embodiment except for the respects otherwise explained.

According to the second modification, a control circuit (spatial processing arithmetic unit 12A) that holds the data (the LUT 12h and the LUT 12n) indicating the relation between the length of the separation distance and the degree of reduction in the correction coefficient, determines the degree of transmission of the light through each of the dimming pixels 148 included in "the line including the predetermined dimming pixel 148 and the other dimming pixels 148 arranged along one of the horizontal synchronization direction (X-direction) and the vertical synchronization direction (Y-direction) of the dimming panel 80 with respect to the predetermined dimming pixel 148". The control circuit also stores, in the memory (line memory LM), the temporary data (temporary value) indicating the degree of transmission of the light through each of the dimming pixels 148 included in the line. The control circuit also determines, based on the temporary data stored in the memory, the degree of transmission of the light through each of the other dimming pixels 148 arranged along the other of the horizontal synchronization direction and the vertical synchronization direction of the dimming panel 80. In this manner, by performing the processing divided into two one-dimensional processes along one and the other of the horizontal synchronization direction and the vertical synchronization direction of the dimming panel 80, the load of the circuit for performing the processing can be lower than that of two-dimensional processing that performs both the processes collectively. Thus, the circuit scale of the control circuit can be reduced. In the weight distribution of the spatial processing, the distribution in the horizontal synchronization direction and the vertical synchronization direction is relatively higher than in other directions (for example, the oblique direction). Therefore, in terms of reduction of the double image and reduction of the halo, the weight distribution is preferable for the viewing angle characteristics (viewing angle characteristics described with reference to FIGS. 9 and 13) of the general display panel 30 often employed in recent years.

Third Modification

Figure 17:
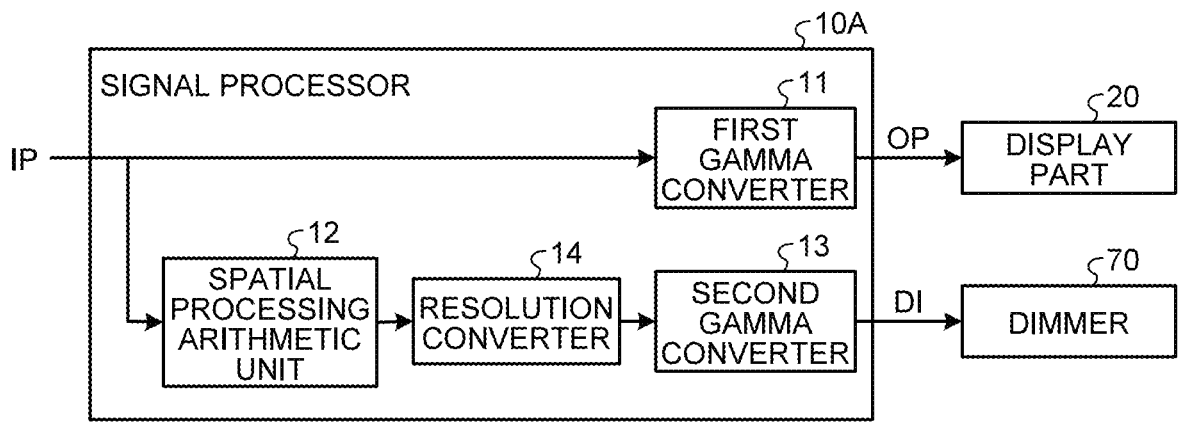
FIG. 17 is a block diagram illustrating a functional configuration example of a signal processor in a third modification.

The following describes a third modification of the embodiment with reference to FIG. 17. In the third modification, the signal processor 10 of the embodiment is replaced with a signal processor 10A to be described later.

FIG. 17 is a block diagram illustrating a functional configuration example of the signal processor 10A in the third modification. The signal processor 10A further includes a resolution converter 14, in addition to the first gamma converter 11, the spatial processing arithmetic unit 12, and the second gamma converter 13 included in the signal processor 10.

The resolution converter 14 in the third modification assumes an array of the dimming gradation values in a two-dimensional X-Y space obtained by combining the dimming gradation values of the respective dimming pixels 148 output from the spatial processing arithmetic unit 12 to be a monochrome image, and performs resolution conversion of the monochrome image. The resolution of the monochrome image after being subjected to the resolution conversion by the resolution converter 14 corresponds to the arrangement in the X-direction and the Y-direction of the dimming pixels 148 included in the dimming panel 80 employed in the third modification. In other words, unlike in the embodiment, the arrangement in the X-direction and the Y-direction of the dimming pixels 148 in the third modification does not correspond to the arrangement in the X-direction and the Y-direction of the pixels 48. Therefore, the resolution converter 14 performs the resolution conversion to generate the data of the dimming gradation values corresponding to the arrangement in the X-direction and the Y-direction of the dimming pixels 148 included in the dimming panel 80 employed in the third modification. The second gamma converter 13 of the third modification is the same as the second gamma converter 13 of the embodiment except that the number of pieces of data of the received dimming gradation values is a number corresponding to the resolution of the monochrome image after being subjected to the resolution conversion by the resolution converter 14.

The algorithm of the resolution conversion performed by the resolution converter 14 may be a known algorithm, or a dedicatedly constructed algorithm. Examples of the known algorithm include a nearest neighbor algorithm and a bilinear algorithm. However, the algorithm is not limited to these examples, and may be another algorithm.

As described above, the third modification is the same as the embodiment except for the respects otherwise explained. The third modification can also be more accurately appropriate for a dimming resolution (number and arrangement of the dimming pixels 148) of the dimming panel 80 that does not directly correspond to the resolution (number and arrangement of the pixels 48) of the display panel 30.

Fourth Modification

Figure 18:
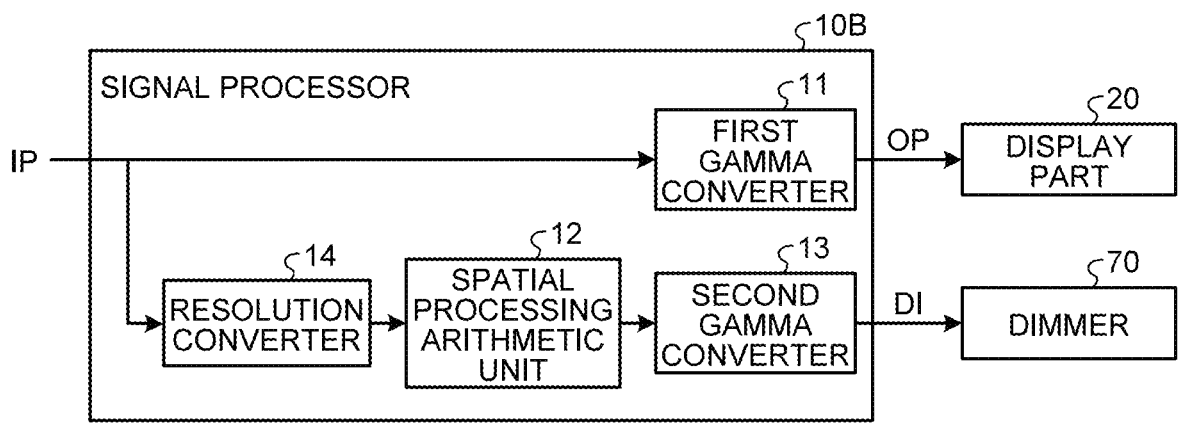
FIG. 18 is a block diagram illustrating a functional configuration example of a signal processor in a fourth modification.

The following describes a fourth modification of the embodiment with reference to FIG. 18. In the fourth modification, the signal processor 10 of the embodiment is replaced with a signal processor 10B to be described later.

FIG. 18 is a block diagram illustrating a functional configuration example of the signal processor 10B in the fourth modification. The signal processor 10B is the same as the signal processor 10A of the third modification in terms of further including the resolution converter 14, in addition to the first gamma converter 11, the spatial processing arithmetic unit 12, and the second gamma converter 13 included in the signal processor 10. However, the resolution converter 14 of the signal processor 10B differs from the resolution converter 14 included in the signal processor 10A of the third modification in terms of converting the resolution of the frame image based on the input signal IP supplied to the spatial processing arithmetic unit 12. The resolution of the frame image after being subjected to the resolution conversion corresponds to the arrangement in the X-direction and the Y-direction of the dimming pixels 148 included in the dimming panel 80 employed in the fourth modification. The spatial processing arithmetic unit 12 of the fourth modification determines the dimming gradation value based on the frame image after being subjected to the resolution conversion.

As described above, the fourth modification is the same as the embodiment except for the respects otherwise explained. The fourth modification can also be more accurately appropriate for a dimming resolution (number and arrangement of the dimming pixels 148) of the dimming panel 80 that does not directly correspond to the resolution (number and arrangement of the pixels 48) of the display panel 30. In addition, when the frame image after being subjected to the resolution conversion by the resolution converter 14 has a lower resolution than that of the frame image before being subjected to the resolution conversion, the processing load caused by the spatial processing arithmetic unit 12 can be further reduced by performing the resolution conversion before the processing by the spatial processing arithmetic unit 12.

The dimming pixel 148 need not include a plurality of the sub-pixels 49. Specifically, one sub-pixel 49 provided in the dimming area DA may serve as one dimming pixel 148. In that case, the arrangement of the sub-pixels 49 provided in the dimming area DA corresponds to the arrangement of the pixels 48 provided in the display area OA.

Other operational advantages accruing from the aspects described in the embodiment herein that are obvious from the description herein or that are appropriately conceivable by those skilled in the art will naturally be understood as accruing from the present disclosure.

What is claimed is:

1. A display device comprising:
   a display panel comprising a plurality of pixels; and
   a dimming panel that is disposed between the display panel and a light source of light to be emitted to the display panel and comprises a plurality of dimming pixels, wherein
   when one of the pixels produces an output at highest luminance and the other pixels produce an output at lowest luminance to the display panel, the light is transmitted through a predetermined one of the dimming pixels located on an optical axis of the light that is emitted to the one of the pixels and through the other dimming pixels arranged around the predetermined dimming pixel, and transmissions of the light through the other dimming pixels decrease at decreasing degrees as the light is away along directions from the predetermined dimming pixel to the other dimming pixels, and the decreasing degrees of the transmissions of the light through the other dimming pixels as the light is away along the directions decrease proportionally depending on the directions from the predetermined dimming pixel to the other dimming pixels.

2. The display device according to claim 1, wherein a degree of transmission of the light through the predetermined dimming pixel located on the optical axis of the light that is emitted to the pixel is determined based on a gradation value of the pixel, and the gradation value is referred to in calculation of a correction value for correcting the degree of transmission of the light through the other dimming pixels arranged around the predetermined dimming pixel, a correction coefficient that is used in the calculation of the correction value decreases as a separation distance increases along one direction orthogonal to the optical axis, the separation distance is a distance from the predetermined dimming pixel to each of the other dimming pixels for which the correction value is calculated, and directions along a plane orthogonal to the optical axis include a plurality of directions having different relations between a length of the separation distance and a degree of reduction in the correction coefficient.

3. The display device according to claim 2, wherein the degree of reduction in the correction coefficient with respect to the length of the separation distance is lower in one of two directions along the plane orthogonal to the optical axis than in the other of the two directions along the plane orthogonal to the optical axis, and a viewing angle in the one of the two directions of the display panel is larger than a viewing angle in the other of the two directions of the display panel.

4. The display device according to claim 3, wherein the one of the two directions is a horizontal synchronization direction of the display panel or a vertical synchronization direction of the display panel.

5. The display device according to claim 3, wherein the one of the two directions is neither a horizontal synchronization direction of the display panel nor a vertical synchronization direction of the display panel.

6. The display device according to claim 2, wherein a degree of transmission of the light through each of the dimming pixels is controlled based on data indicating the relation between the length of the separation distance and the degree of reduction in the correction coefficient.

7. The display device according to claim 6, comprising a control circuit to hold the data, wherein the control circuit is configured to determine the degree of transmission of the light through each of the dimming pixels based on the gradation value of each of the pixels indicated by an image signal supplied to the display panel and on the data.

8. The display device according to claim 7, wherein the control circuit is configured to:

determine the degree of transmission of the light through each of the dimming pixels included in a line including the predetermined dimming pixel and the other dimming pixels arranged along one of the horizontal synchronization direction and the vertical synchronization direction of the dimming panel with respect to the predetermined dimming pixel, store, in a memory, temporary data indicating the degree of transmission of the light through each of the dimming pixels included in the line, and determine, based on the temporary data stored in the memory, the degree of transmission of the light through each of the other dimming pixels arranged along the other of the horizontal synchronization direction and the vertical synchronization direction of the dimming panel.

9. The display device according to claim 1, wherein each of the pixels comprises a plurality of sub-pixels, the sub-pixels comprise respective color filters configured to transmit light in different colors, and the dimming pixel is provided for each of the pixels.

10. The display device according to claim 9, wherein one or more of the dimming pixels are provided for each of the pixels.

11. The display device according to claim 1, comprising the light source.

* * * * *